US011709317B2

(12) United States Patent
Sugama

(10) Patent No.: US 11,709,317 B2
(45) Date of Patent: Jul. 25, 2023

(54) WAVELENGTH DEMULTIPLEXER, OPTICAL TRANSCEIVER FRONT-END MODULE, PHOTONIC CIRCUIT, AND WAVELENGTH DEMULTIPLEXING CONTROL METHOD

(71) Applicant: FUJITSU LIMITED, Kawasaki (JP)

(72) Inventor: Akio Sugama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 17/530,653

(22) Filed: Nov. 19, 2021

(65) Prior Publication Data

US 2022/0236483 A1 Jul. 28, 2022

(30) Foreign Application Priority Data

Jan. 27, 2021 (JP) .................................. 2021-010832

(51) Int. Cl.
*H04B 10/61* (2013.01)
*H04B 10/67* (2013.01)
(Continued)

(52) U.S. Cl.
CPC ......... *G02B 6/12007* (2013.01); *G02B 6/126* (2013.01); *H04B 10/073* (2013.01);
(Continued)

(58) Field of Classification Search
CPC .. H04B 10/0795; H04B 10/40; H04B 10/614; H04B 10/615; H04B 10/616;
(Continued)

(56) References Cited

U.S. PATENT DOCUMENTS

2009/0238579 A1* 9/2009 Rahn .................... H04B 10/697
398/208
2016/0007105 A1* 1/2016 Jeong ................. H04B 10/0795
398/48

(Continued)

FOREIGN PATENT DOCUMENTS

JP 63-046022 A 2/1988
JP 2016-018048 A 2/2016
(Continued)

*Primary Examiner* — Li Liu
(74) *Attorney, Agent, or Firm* — ArentFox Schiff LLP

(57) ABSTRACT

A wavelength demultiplexer includes a photonic circuit and a control circuit that adjusts wavelength characteristics of the photonic circuit. The photonic circuit converts two orthogonal polarized waves contained in the incident light into two same polarized waves, which are supplied to a first optical demultiplexing circuit and a second optical demultiplexing circuit provided in the photonic circuit and having the same configuration. The photonic circuit supplies a total output power of monitor lights extracted from the same positions in the first optical demultiplexing circuit and the second optical demultiplexing circuit to the control circuit. The control circuit controls a first wavelength characteristic of the first optical demultiplexing circuit and a second wavelength characteristic of the second optical demultiplexing circuit based on the total output power of the monitor lights.

12 Claims, 13 Drawing Sheets

(51) Int. Cl.

| | |
|---|---|
| *H04B 10/69* | (2013.01) |
| *H04J 14/02* | (2006.01) |
| *G02B 6/12* | (2006.01) |
| *G02B 6/293* | (2006.01) |
| *G02B 6/126* | (2006.01) |
| *H04B 10/073* | (2013.01) |
| *H04J 14/06* | (2006.01) |
| *H04B 10/40* | (2013.01) |
| *H04B 10/079* | (2013.01) |

(52) U.S. Cl.
CPC ......... *H04B 10/0795* (2013.01); *H04B 10/40* (2013.01); *H04B 10/614* (2013.01); *H04B 10/615* (2013.01); *H04B 10/616* (2013.01); *H04B 10/6166* (2013.01); *H04B 10/67* (2013.01); *H04B 10/69* (2013.01); *H04J 14/02* (2013.01); *H04J 14/06* (2013.01); *G02B 6/29352* (2013.01); *G02B 2006/12159* (2013.01); *G02B 2006/12164* (2013.01)

(58) Field of Classification Search
CPC .... H04B 10/6166; H04B 10/67; H04B 10/69; H04J 14/02; G02B 6/12007; G02B 6/29352; G02B 2006/12164
USPC .......................... 398/136, 209, 213, 214, 48
See application file for complete search history.

(56) References Cited

U.S. PATENT DOCUMENTS

| | | | |
|---|---|---|---|
| 2016/0065314 A1* | 3/2016 | Nazarathy | H04B 10/6151 398/202 |
| 2019/0097732 A1* | 3/2019 | Akiyama | H04B 10/07955 |
| 2019/0229811 A1* | 7/2019 | Gupta | H04B 10/614 |
| 2019/0245642 A1* | 8/2019 | Akiyama | G02B 6/29355 |
| 2020/0366379 A1* | 11/2020 | Jafari | H04B 10/532 |
| 2021/0006044 A1* | 1/2021 | Hong | G02B 27/286 |

FOREIGN PATENT DOCUMENTS

| | | |
|---|---|---|
| JP | 2019-061121 A | 4/2019 |
| JP | 2019-135524 A | 8/2019 |

\* cited by examiner

| INITIAL VALUE MEMORY | OPERATING VALUE MEMORY |
|---|---|
| AMZ.1a initial value [1a] <br><br> AMZ.1b initial value [1b] | AMZ.1 operating value [V1] |
| AMZ.2a initial value [2a] <br><br> AMZ.2b initial value [2b] | AMZ.2 operating value [V2] |
| AMZ.3a initial value [3a] <br><br> AMZ.3b initial value [3b] | AMZ.3 operating value [V3] |

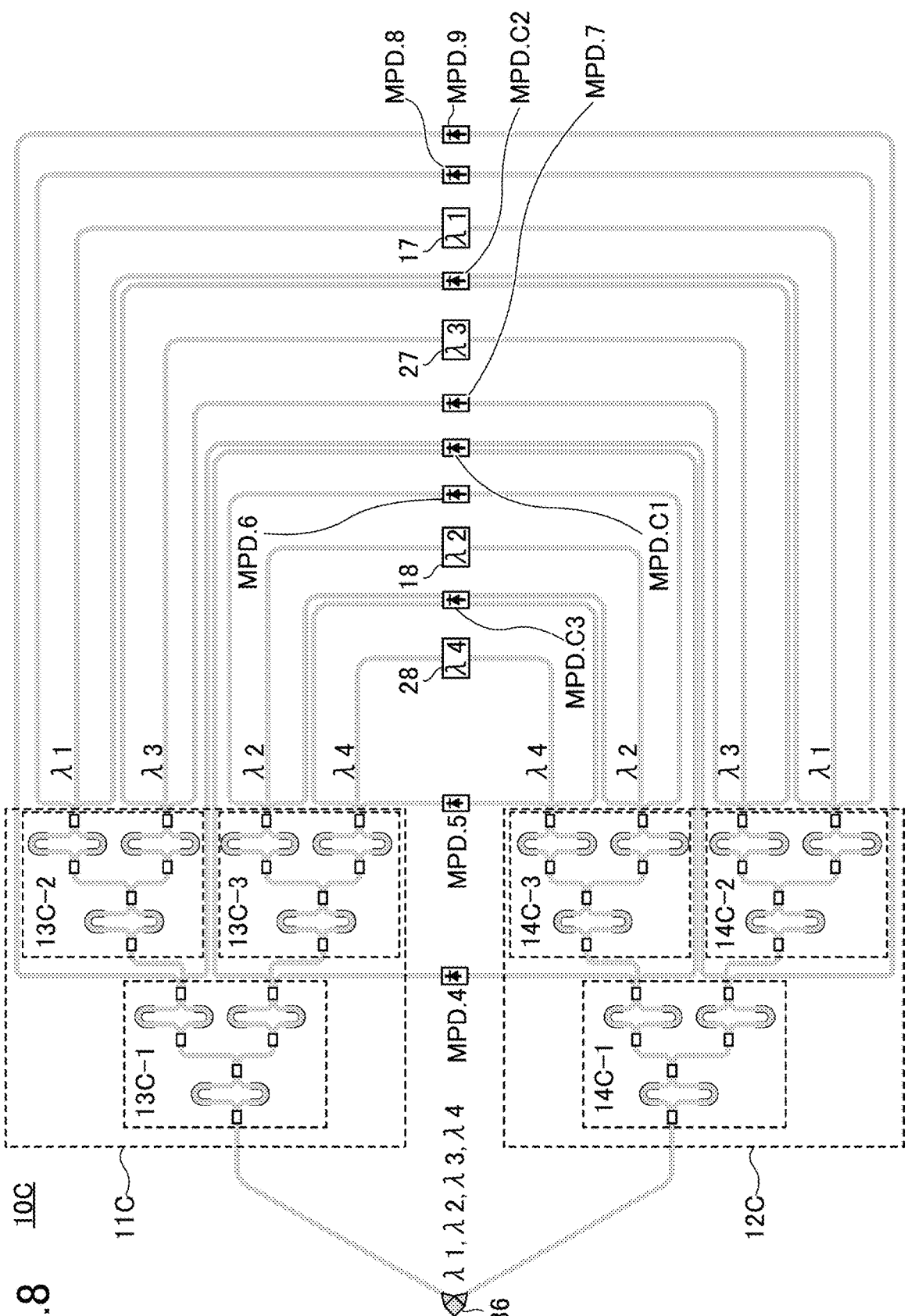

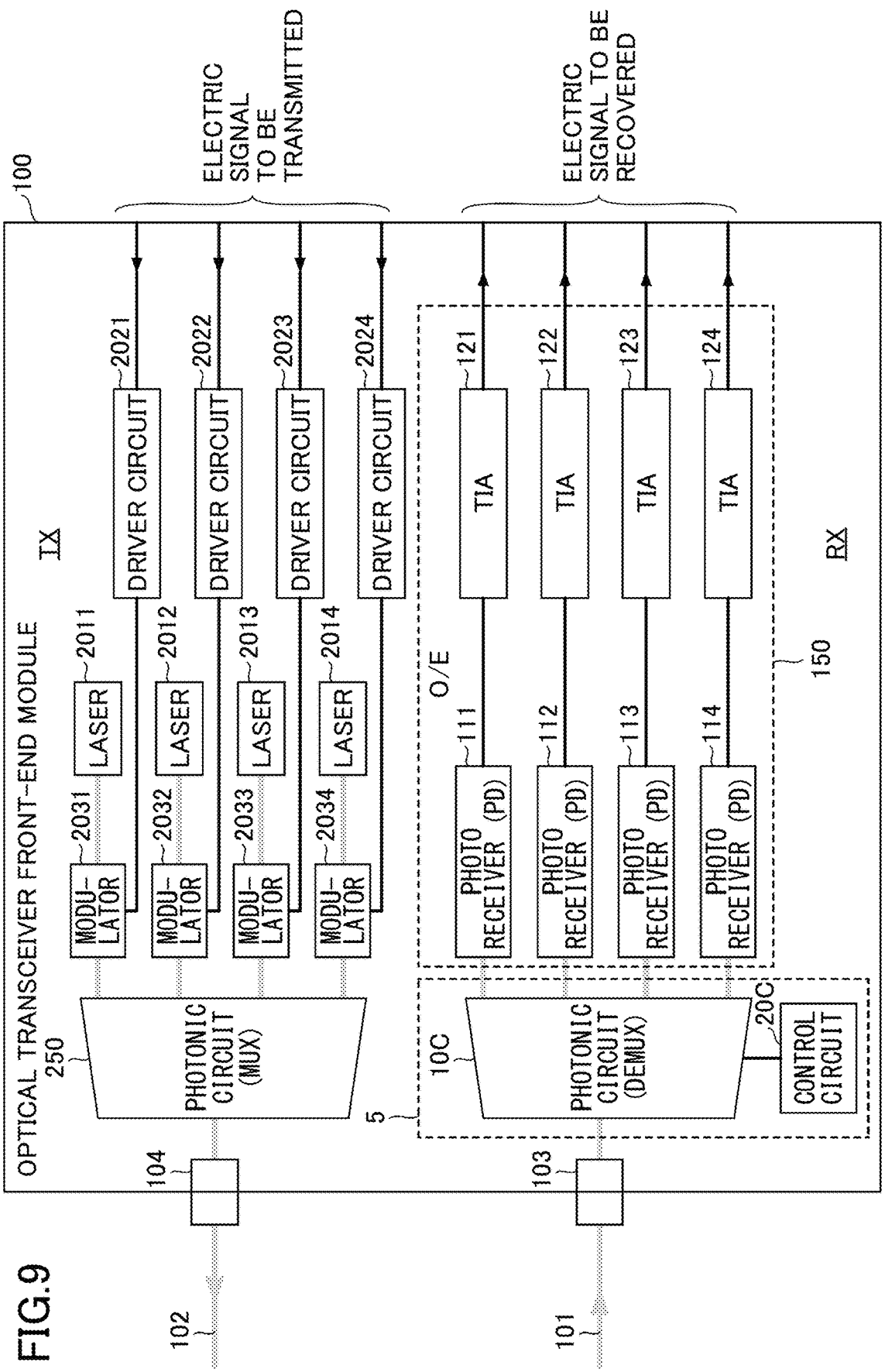

WAVELENGTH DEMULTIPLEXER, OPTICAL TRANSCEIVER FRONT-END MODULE, PHOTONIC CIRCUIT, AND WAVELENGTH DEMULTIPLEXING CONTROL METHOD

CROSS-REFERENCE TO RELATED APPLICATIONS

This application is based upon and claims priority to earlier Japanese Patent Application No. 2021-010832 filed Jan. 27, 2021, which is incorporated herein by reference in its entirety.

FIELD

The present documents relate to a wavelength demultiplexer, an optical transceiver front-end module, a photonic circuit, and a wavelength demultiplexing control method.

BACKGROUND

Optical signals are suited to high-speed, high-capacity data transmission, and are widely used in the fields of data communications and data processing. In order to increase the data transmission rate, a wavelength division multiplexing (WDM) scheme for superimposing signals of different wavelengths into one optical fiber is adopted. In a WDM system, signals of multiple wavelengths are bundled or multiplexed at a transmitter side, and separated or demultiplexed at a receiver side. Various schemes of wavelength multiplexing and demultiplexing have been proposed, but the basic idea is to separate narrowly spaced wavelengths making use of interference. In general, interferometers tend to increase the device size. However, owing to the progress of silicon photonics technology, the device can be downsized.

Silicon photonic devices are greatly affected by manufacturing tolerances, because of their microscopic structures. In particular, it is not easy for a WDM device to achieve a desired wavelength characteristic at each of the wavelengths from the beginning in the initial state. In addition, light interference is sensitive to environmental changes including a temperature change. It is unrealistic to operate the device without any adjustment, and some tuning mechanism is required. A configuration has been proposed to monitor an optical power at a demultiplexer using an asymmetric Mach-Zehnder (AMZ) interferometer, and to separate the respective wavelengths, while compensating for manufacturing variations or characteristic fluctuation occurring due to a temperature change. See, for example, Patent Documents 1 and 2 presented below.

In silicon photonic devices, light behavior greatly differs between TE polarized waves and TM polarized waves, and devices are designed so as to operate for either one of the polarized waves, typically for TE polarized wave. The polarization state of light travelling through an optical fiber is unstable, and the polarized wave incident onto a silicon photonic device is not always a TE wave. In addition, fluctuation of polarization state over time occurs due to the influence of vibration of the optical fiber.

A technique of appropriately demultiplexing multiple wavelengths is desired, while reducing the influence of polarization. An optical device adapted to suppress the influence of the polarization state of incident light is known. See, for example, Patent Document 3.

Prior art document(s) described above is(are):
Patent Document 1: JP Patent Application Laid-open Publication No. 2019-061121,
Patent Document 2: JP Patent Application Laid-open Publication No. 2019-135524, and
Patent Document 3: JP Patent Application Laid-open Publication No. 2016-18048.

SUMMARY

In an embodiment, a wavelength demultiplexer includes a photonic circuit that converts two orthogonal polarized waves contained in incident light into two same polarized waves, the photonic circuit having a first optical demultiplexing circuit and a second optical demultiplexing circuit having a same configuration and provided for the respective ones of the two same polarized waves; and a control circuit that adjusts the wavelength characteristics of the first optical demultiplexing circuit and the second optical demultiplexing circuit. The photonic circuit supplies a total output power of monitor lights extracted from the same positions in the first optical demultiplexing circuit and the second optical demultiplexing circuit to the control circuit. The control circuit controls a first wavelength characteristic of the first optical demultiplexing circuit and a second wavelength characteristic of the second optical demultiplexing circuit based on the total output power of the monitor lights.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 4 illustrates an example of initial value and operating value information saved in a memory;

FIG. 8 is a schematic diagram of a photonic circuit that separates four wavelengths; and FIG. 9 is a schematic diagram of an optical transceiver front-end module using a wavelength demultiplexer.

EMBODIMENT(S)

Figure 1:
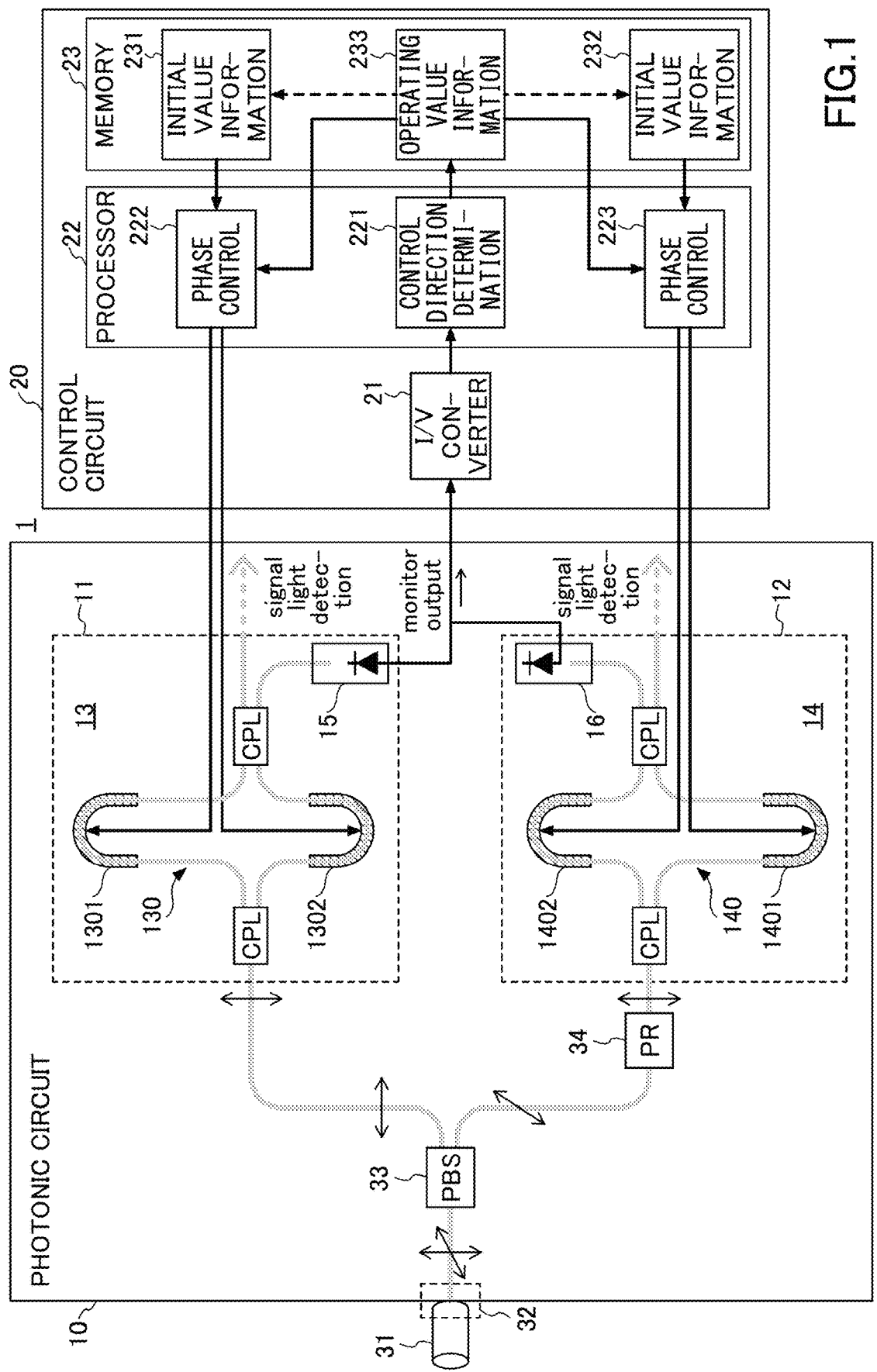
FIG. 1 is a basic diagram of a wavelength demultiplexer having a photonic circuit to which polarization diversity is applied.

Embodiments for implementing the invention will be described below with reference to the drawings. In the following description, the same elements may be denoted by the same reference numerals and redundant description may be omitted.

FIG. 1 illustrates a basic configuration of a wavelength demultiplexer 1 with a photonic circuit 10 to which polarization diversity is applied. The wavelength demultiplexer 1 includes a photonic circuit 10, and a control circuit 20 that adjusts the wavelength characteristics of the photonic circuit 10. An optical signal is input to the photonic circuit 10 through, for example, a single-mode optical fiber 31. Light beams with a plurality of wavelengths are multiplexed in the optical signal. In the example of FIG. 1, the optical fiber 31 extends in a direction parallel to the surface of the photonic circuit 10, and is coupled to a waveguide (e.g., a silicon waveguide) formed on the photonic circuit 10 using an edge coupler 32. The edge coupler 32 may be called a spot size converter, and it can be formed on the photonic circuit 10 by a known technique. The light incident direction onto the photonic circuit 10 is not limited to the horizontal direction. The light signal may be introduced to the photonic circuit 10 from a direction perpendicular or oblique to the surface of the photonic circuit 10.

The light input to the photonic circuit 10 includes both a TE polarized wave and a TM polarized wave, due to the influence of the transmission line. The TE polarized wave oscillates in a direction orthogonal to the incident axis and horizontal to the plane of the photonic circuit 10. The TM polarized wave oscillates in a direction orthogonal to the axis of incidence and perpendicular to the plane of the photonic circuit 10. The light incident on the photonic circuit 10 is split into the TE polarized wave and the TM polarized wave by a polarization beam splitter 33 (hereinafter abbreviated as "PBS 33"). The polarization plane of one of the split polarized waves, for example, the TM polarized wave is rotated by 90 degrees by a polarization rotator 34 (hereinafter, abbreviated as "PR34"). As a result, two TE polarization components are generated.

The PBS 33 and the PR 34 may be formed by waveguides on the photonic circuit 10 by a known technique. The PBS 33 can be fabricated with, for example, a directional coupler having a tapered waveguide. The PR 34 can be fabricated using, for example, a double core structure having different refractive indexes.

The photonic circuit 10 has a first optical demultiplexing circuit 11 and a second optical demultiplexing circuit 12 provided for the two same polarizations. The first optical demultiplexing circuit 11 and the second optical demultiplexing circuit 12 have the same configuration. The term "same configuration" means that the basic designs are the same, and they may include a manufacturing error within an acceptable range. In FIG. 1, the first optical demultiplexing circuit 11 and the second optical demultiplexing circuit 12 are mirror-symmetrical, that is, symmetrically arranged with respect to the center line extending in the propagation direction of the photonic circuit 10, but the basic design is the same.

The first optical demultiplexing circuit 11 is formed by a unit circuit 13. The unit circuit 13 has an AMZ interferometer 130 and heaters 1301 and 1302 provided to the waveguides of the AMZ interferometer 130. The second optical demultiplexing circuit 12 is formed by a unit circuit 14 having the same configuration as the unit circuit 13, the layout being mirror-symmetric. The unit circuit 14 has an AMZ interferometer 140 having the same configuration as the AMZ interferometer 130, and heaters 1401 and 1402 may be provided to the waveguides of the AMZ interferometer 140.

The heaters 1301, 1302, 1401 and 1402 are provided to adjust the wavelength characteristics of the first optical demultiplexing circuit 11 and the second optical demultiplexing circuit 12, and they may serve as phase shifters that change the refractive indexes of the corresponding waveguides. As long as the wavelength characteristic is adjusted, any structure may be used to adjust the refractive index of the corresponding waveguide to control the phase of light travelling through that waveguide. Accordingly, another mechanism such as a current injection structure, a voltage applying structure, a pressurizing structure, etc. may be provided, in place of the heaters.

In an AMZ interferometer, the wavelength shifting direction is opposite between the upper and lower waveguides (which are also called "upper and lower arms"). Accordingly, if heaters or other mechanism are provided to the both (upper and lower) waveguides for controlling the refractive index, either one of the heaters that can adjust the wavelength characteristics with less power may be selected. The two waveguides of each AMZ interferometer are split and combined by couplers (CPLs). The first optical demultiplexing circuit 11 and the second optical demultiplexing circuit 12 have wavelength separating functions, as described later. In order to simplify the illustration and facilitate understanding of the basic structure, some portions of the unit circuits 13 and 14 are omitted in FIG. 1.

In the first optical demultiplexing circuit 11 and the second optical demultiplexing circuit 12, the optical power is monitored at the same positions. In FIG. 1, signal light is extracted from one of the two output ports of the AMZ interferometer 130, and a monitor photodetector 15 is connected to the other output port, at which the optical power of the signal light is monitored. Similarly, signal light is extracted from one of the two output ports of the AMZ interferometer 140, and a monitor photodetector 16 is connected to the other output port to monitor the optical power of the corresponding signal light.

If the wavelength of the incident light on the photonic circuit 10 is in the 1.31 µm band or 1.55 µm band used for optical communications, germanium photodiodes may be used as the monitor photodetectors 15 and 16. At the germanium photodetector, the light having travelled through the silicon waveguide is absorbed, and a photocurrent corresponding to the intensity of the incident light is generated and output.

The outputs of the monitor photodetectors 15 and 16 are summed up and supplied to the control circuit 20. Depending on the polarization state in the optical fiber 31, the light quantity of polarized wave incident on one of the optical demultiplexing circuits may be insufficient. With a typical structure for acquiring the monitor results independently from the first optical demultiplexing circuit 11 and the second optical demultiplexing circuit 12, a satisfactory monitoring result may not be obtained from one of the optical demultiplexing circuits. In such a case, the wavelength characteristic of each of the optical demultiplexing circuits may not be correctly tuned. Even if the initial state of the photonic circuit can be appropriately adjusted using an initial correction value or the like, the wavelength characteristic cannot follow the future changes likely to occur in the environment or the optical fiber.

With the photonic circuit 10 of the embodiment, the sum of the monitoring results of the optical powers acquired from the same positions in the first optical demultiplexing circuit 11 and the second optical demultiplexing circuit 12 having the same configuration is used, as the basis for tuning the wavelength characteristics. With this structure, the monitoring result of the optical power can be secured, regardless of the polarization state in the optical fiber 31. When the polarization state fluctuates, the distribution ratio of light incident on the first optical demultiplexing circuit 11 and the second optical demultiplexing circuit 12 may vary, but the total monitor value does not change, and a stable monitor result can be acquired.

In the photonic circuit 10, the monitoring result is shared between the first optical demultiplexing circuit 11 and the second optical demultiplexing circuit 12. However, there may not be a guarantee that the wavelength characteristics of the AMZ interferometers having the same configuration and provided at the same positions in the first optical demultiplexing circuit 11 and the second optical demultiplexing circuit 12 are the same. This is because the wavelength characteristics fluctuate due to manufacturing tolerances, environmental change, or other factors.

In a configuration example, the variation in the initial state between the first optical demultiplexing circuit 11 and the second optical demultiplexing circuit 12 is measured in advance, and the measurement result is used as an initial value for correction. The initial value is used to cancel the variation or the difference in the wavelength characteristic between the two optical demultiplexing circuits. The optical power monitored in the photonic circuit is shared between the first optical demultiplexing circuit 11 and the second optical demultiplexing circuit 12. How the initial value is set will be described later.

The sum of the monitoring results obtained from the photonic circuit 10 is supplied to the control circuit 20. The control circuit 20 includes a current-voltage converter 21 (hereinafter, abbreviated as "I/V converter 21"), a processor 22, and a memory 23. The control circuit 20 adjusts the wavelength characteristics of the first optical demultiplexing circuit 11 and the second optical demultiplexing circuit 12, based on the sum of the monitoring results.

Figure 2:
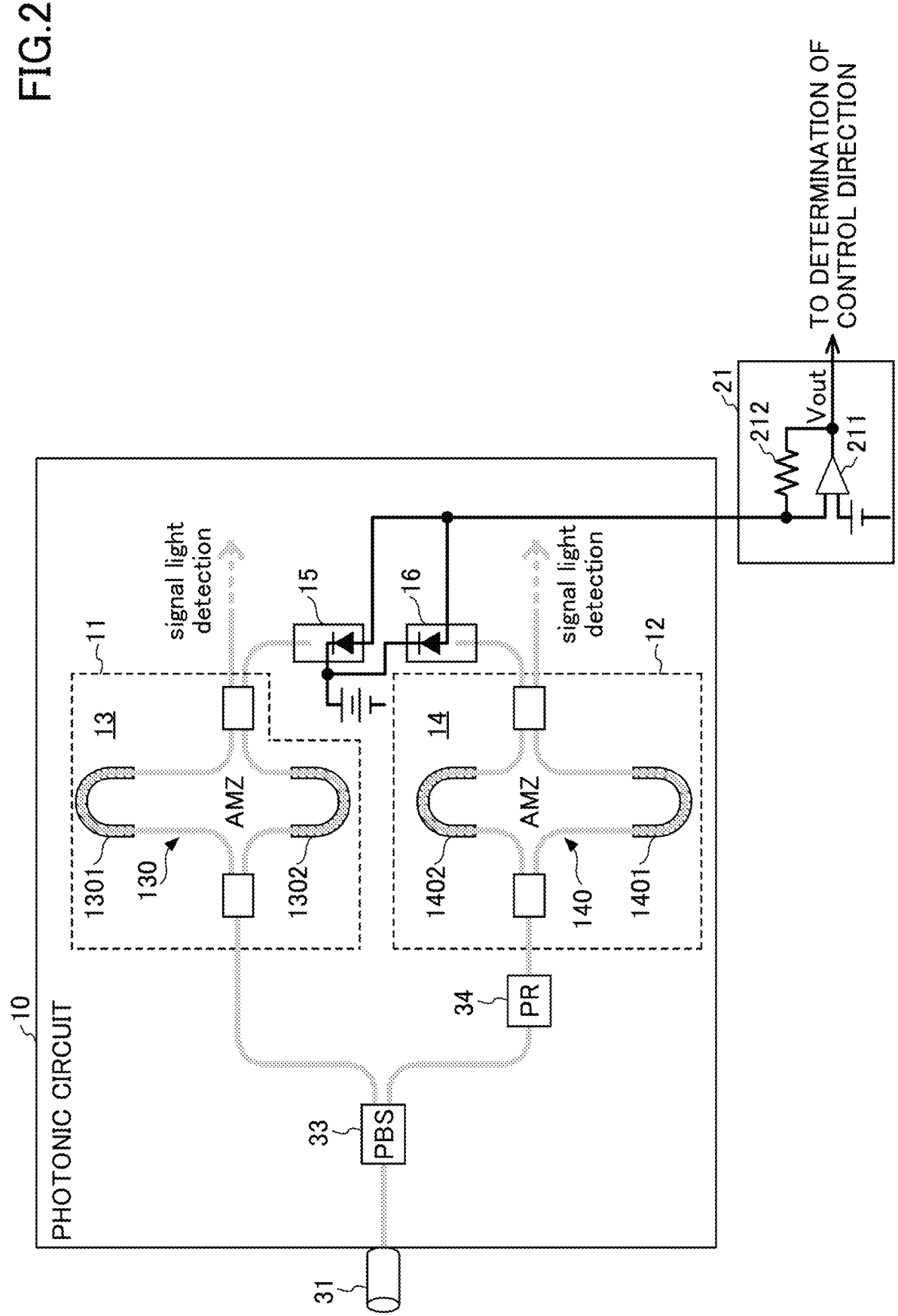
FIG. 2 illustrates a configuration example for combining the output signals of monitor photodetector.

As illustrated in FIG. 2, the I/V converter 21 can be designed as a typical negative feedback circuit. The photocurrents output from the monitor photodetectors 15 and 16 are added, and the total current is connected to one of the input terminals of the operational amplifier 211. The other of the input terminals of the operational amplifier 211 is connected to, for example, a constant potential. The 180-degree phase inverted output of the operational amplifier 211 is connected to the input of the operational amplifier 211 via a feedback resistor 212. The feedback resistor 212 converts the total of the output currents of the monitor photodetectors 15 and 16 into a voltage, and the voltage Vout is output from the I/V converter 21.

Returning to FIG. 1, the output of the I/V converter 21 is connected to the input of the processor 22. An analog-to-digital converter (ADC) may be provided before the input to the processor 22 to input a digital value of an analog voltage signal to the processor 22, or alternatively, the processor 22 may include an ADC.

The processor 22 has a control direction determination unit 221 and phase control units 222 and 223 as its functions. The memory 23 has initial value information items 231 and 232 and operating value information 233. The initial value information is used to correct the characteristic deviation or variation between interfering elements (e.g., AMZ interferometers) having the same configuration and used in the first optical demultiplexing circuit 11 and the second optical demultiplexing circuit 12. The operating value information includes a control amount n×Δ (where n is an integer) for adjusting the wavelength characteristics of the AMZ interferometers 130 and 140 provided in the unit circuits 13 and 14. The initial value information may be set during, for example, a pre-shipment inspection, using the operating value information.

The phase control units 222 and 223 control the phases of the light beams passing through the AMZ interferometers 130 and 140, respectively, until the control direction determination unit 221 has judged that the monitored light power has increased or decreased in a desired direction. By adjusting the amount of current or the voltage level applied to the heater 1301 or 1302 of the AMZ interferometer 130, or to the heater 1401 or 1402 of the AMZ interferometer 140, the refractive index of the waveguide changes, and the phase of the light beam traveling through the waveguide is controlled. Based on the summed-up monitoring result of the photonic circuit 10 to which the polarization diversity is applied, the phase adjustment for the first optical demultiplexing circuit 11 and the second optical demultiplexing circuit 12 is repeated at a predetermined step size Δ of the control amount. Consequently, a plurality of wavelengths contained in the received light can be demultiplexed, while reducing the influence of polarization.

<Separation of 2 Wavelengths>

Figure 3A:
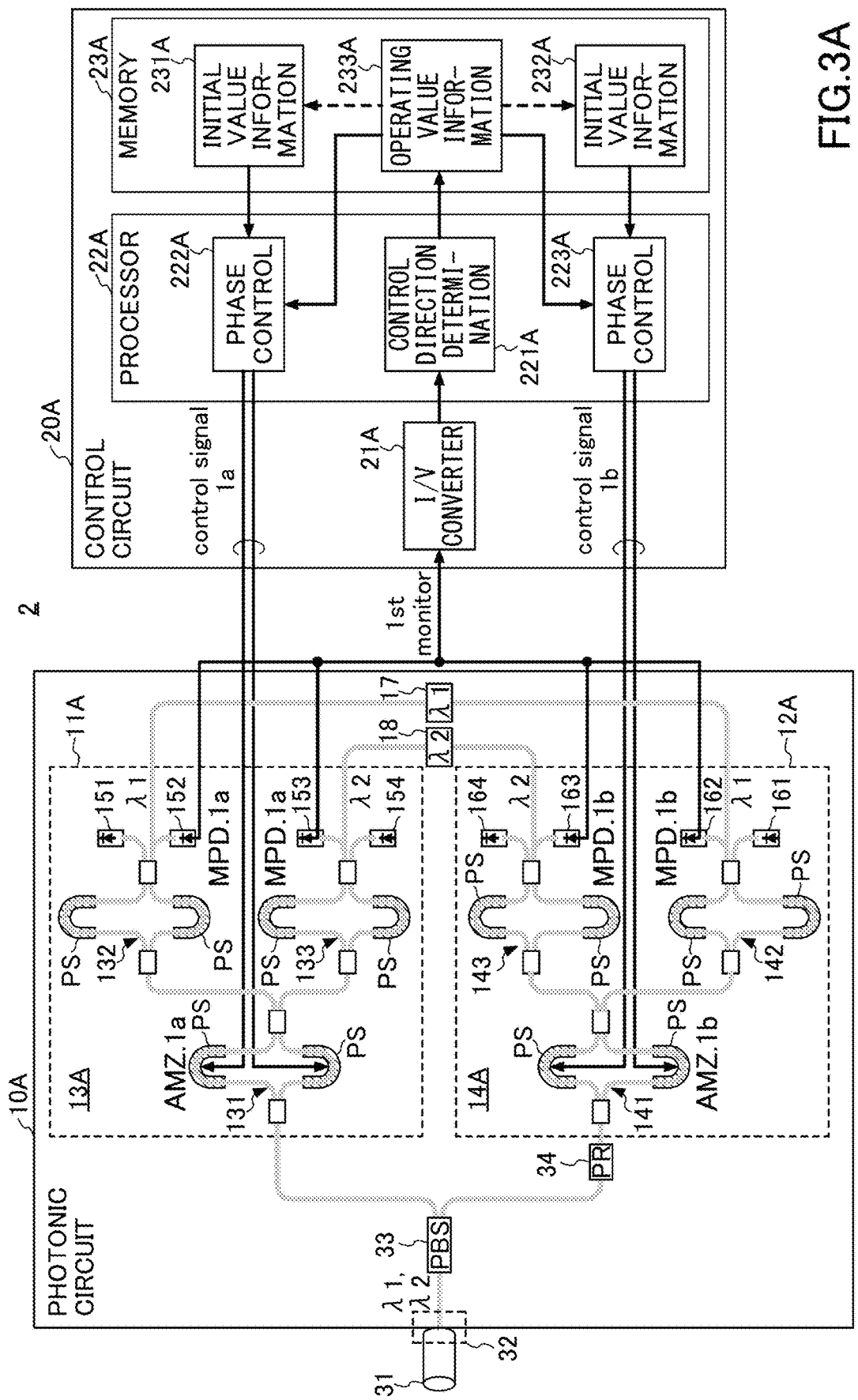
FIG. 3A illustrates a configuration example of a wavelength demultiplexer that separates two wavelengths, showing control on a first AMZ interferometer which is a unit circuit forming an optical demultiplexing circuit.
Figure 3B:
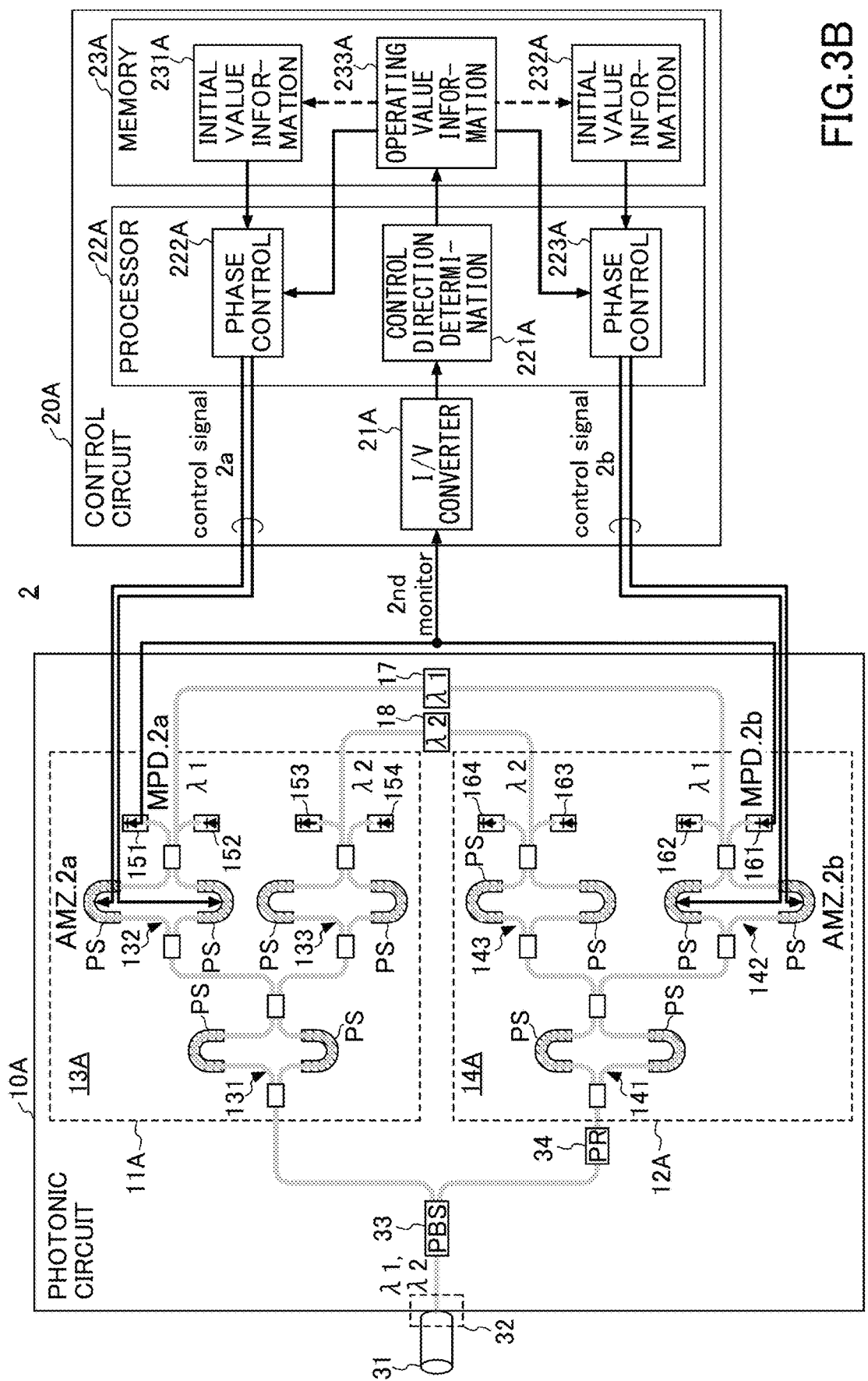
FIG. 3B illustrates a configuration example of a wavelength demultiplexer that separates two wavelengths, showing control on a second AMZ interferometer which is also a unit circuit forming the optical demultiplexing circuit.
Figure 3C:
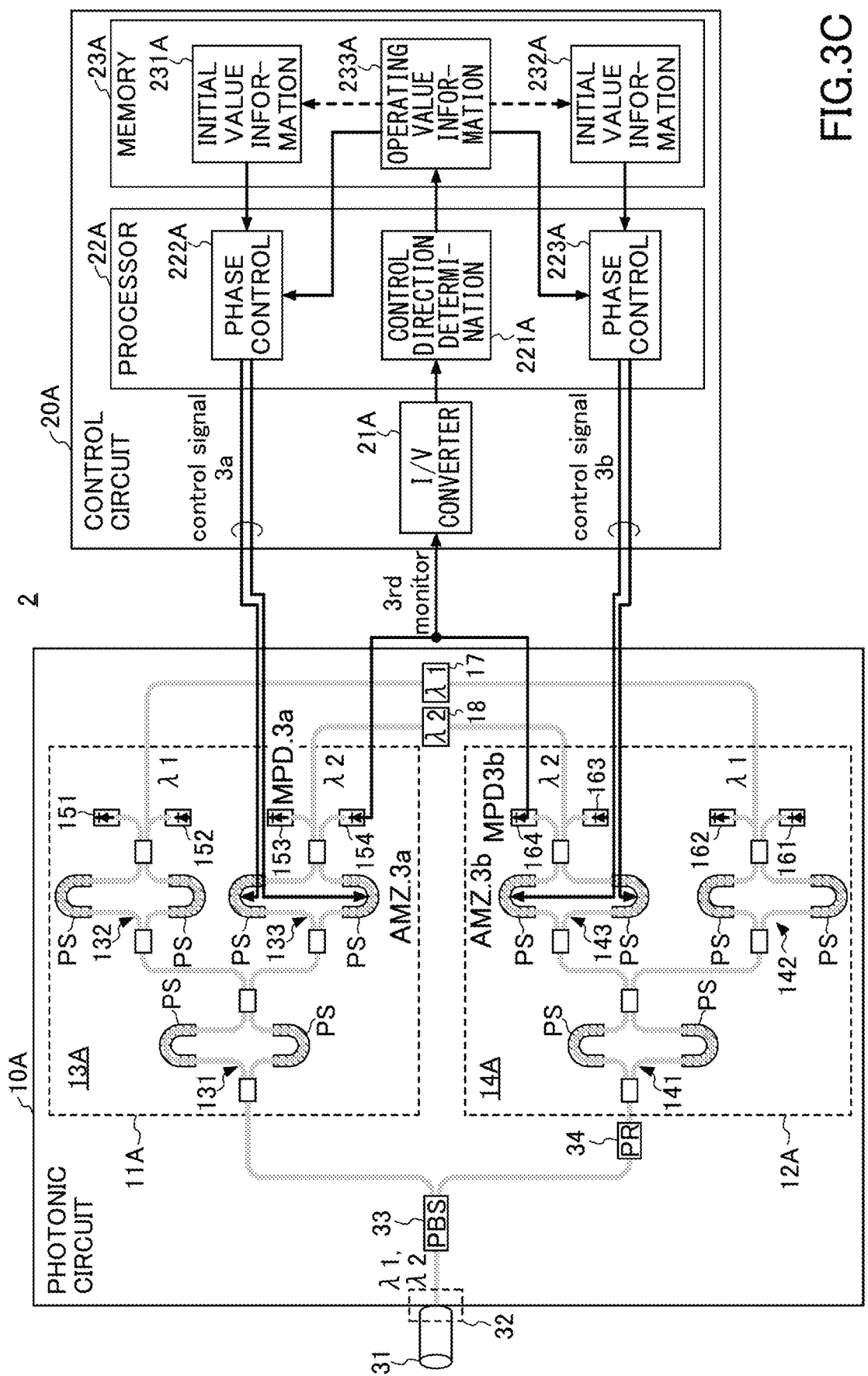
FIG. 3C illustrates a configuration example of a wavelength demultiplexer that separates two wavelengths, showing control on a third AMZ interferometer which is also a unit circuit forming the optical demultiplexing circuit.

FIG. 3A to FIG. 3C are schematic diagrams of a wavelength demultiplexer 2 that separates two wavelengths. The wavelength demultiplexer 2 includes a photonic circuit 10A and a control circuit 20A. The photonic circuit 10A includes a first optical demultiplexing circuit 11A and a second optical demultiplexing circuit 12A having the same configuration. As in FIG. 1, the first optical demultiplexing circuit 11A and the second optical demultiplexing circuit 12A are provided mirror-symmetrically. The two wavelengths are separated in each of the first optical demultiplexing circuit 11A and the second optical demultiplexing circuit 12A.

The first optical demultiplexing circuit 11A has a unit circuit 13A composed of three AMZ interferometers 131, 132, and 133. The unit circuit 13A has a tree structure in which the second AMZ interferometer 132 and the third AMZ interferometer 133 are connected to the two output ports of the first AMZ interferometer 131. The second optical demultiplexing circuit 12A has a unit circuit 14A composed of three AMZ interferometers 141, 142, and 143. The unit circuit 14A has a tree structure in which a second AMZ interferometer 142 and a third AMZ interferometer 143 are connected to the two output ports of the first AMZ interferometer 141. The splitting and the combining regions of each of the AMZ interferometers are formed by, for example, 3 dB couplers.

FIG. 3A illustrates optical power monitoring and wavelength characteristic control for the first AMZ interferometers 131 and 141 included in the unit circuits 13A and 14A, respectively. FIG. 3B illustrates optical power monitoring and wavelength characteristic control for the second AMZ interferometers 132 and 142 included in the unit circuits 13A and 14A, respectively. FIG. 3C illustrates optical power monitoring and wavelength characteristic control for the third AMZ interferometers 133 and 143 included in the unit circuits 13A and 14A, respectively.

In FIG. 3A to FIG. 3C, the power monitoring and wavelength characteristic control for the three AMZ interferometers included in a unit circuit are illustrated in separate figures for the purpose of simplifying the drawings and avoiding complicated electrical wirings. In actual operations, the optical power monitoring and wavelength characteristic control for the three AMZ interferometers 131, 132, and 133 included in the unit circuit 13A and for the three AMZ interferometers 141, 142, and 143 included in the unit circuit 14A are performed simultaneously.

Referring to FIG. 3A, the light incident from the optical fiber 31 onto the photonic circuit 10A contains light components with wavelengths $\lambda 1$ and $\lambda 2$. The incident light is subjected to polarization beam splitting at the PBS 33. For example, the TE polarization including $\lambda 1$ and $\lambda 2$ is guided to the first optical demultiplexing circuit 11A. The TM polarization including $\lambda 1$ and $\lambda 2$ is guided to the second light demultiplexing circuit 12A after the polarization plane is rotated by 90 degrees at the PR 34.

In the first optical demultiplexing circuit 11A, the transmission spectrum having a peak at $\lambda 1$ and the transmission spectrum having a peak at $\lambda 2$ are separated by the difference in optical path length of the first AMZ interferometer 131. This first AMZ interferometer 131 is referred to as "AMZ.1$a$". Similarly, in the second optical demultiplexing circuit 12A, the transmission spectrum having a peak at $\lambda 1$ and the transmission spectrum having a peak at $\lambda 2$ are separated by the difference in optical path length of the first AMZ interferometer 141. This first AMZ interferometer 141 is referred to as "AMZ.1$b$".

In the first optical demultiplexing circuit 11A, the transmission spectrum having a peak at $\lambda 1$ is incident on the second AMZ interferometer 132, and the transmission spectrum having a peak at $\lambda 2$ is incident on the third AMZ interferometer 133. A total of four monitor photodetectors 151, 152, 153 and 154 are provided to the output ports of the second AMZ interferometer 132 and the third AMZ interferometer 133. The second optical demultiplexing circuit 12A has the same configuration as the first optical demultiplexing circuit 11A, and a total of four monitor photodetectors 161, 162, 163 and 164 are provided to the output ports of the second AMZ interferometer 142 and the third AMZ interferometer 143.

In the first optical demultiplexing circuit 11A, signal light of wavelength $\lambda 1$ is extracted from one of the two output ports of the second AMZ interferometer 132, and the monitor photodetector 151 is connected to the other output port. The monitor photodetector 151 is used for adjusting the wavelength characteristics of the second AMZ interferometer 132, as will be described below with reference to FIG. 3B.

A portion of the signal light of wavelength $\lambda 1$ is branched and supplied to the monitor photodetector 152. The monitor photodetector 152 is used to control the wavelength characteristics of the first AMZ interferometer 131. This monitor photodetector 152 is referred to as "MPD.1$a$".

Signal light of wavelength $\lambda 2$ is extracted from one of the two output ports of the third AMZ interferometer 133, and a monitor photodetector 154 is connected to the other output port. The monitor photodetector 154 is used for adjusting the wavelength characteristics of the third AMZ interferometer 133, as will be described below with reference to FIG. 3C. A portion of the signal light of wavelength $\lambda 2$ is branched and supplied to the monitor photodetector 153. The monitor photodetector 153 is used to control the wavelength characteristics of the first AMZ interferometer 131. This monitor photodetector 153 is also referred to as "MPD.1$a$".

The second optical demultiplexing circuit 12A has the same configuration as the first optical demultiplexing circuit 11A. Signal light of wavelength $\lambda 1$ is extracted from one of the two output ports of the second AMZ interferometer 142, and a monitor photodetector 161 is connected to the other output port. The monitor photodetector 161 is used for adjusting the wavelength characteristics of the second AMZ interferometer 142, as will be described below with reference to FIG. 3B.

A portion of the signal light of wavelength $\lambda 1$ is branched and supplied to the monitor photodetector 162. The monitor photodetector 162 is used to control the wavelength characteristics of the first AMZ interferometer 141. This monitor photodetector 162 is referred to as "MPD.1$b$".

The signal light of wavelength $\lambda 2$ is extracted from one of the two output ports of the third AMZ interferometer 143, and the monitor photodetector 164 is connected to the other output port. The monitor photodetector 164 is used for adjusting the wavelength characteristics of the third AMZ interferometer 143, as will be described below with reference to FIG. 3C. A portion of the signal light of wavelength $\lambda 2$ is branched and supplied to the monitor photodetector 163. The monitor photodetector 163 is used to control the wavelength characteristics of the first AMZ interferometer 141. This monitor photodetector 163 is also referred to as "MPD.1$b$".

The outputs of the monitor photodetectors 152 and 153 (collectively referred to as "MPD.1$a$") and the outputs of the monitor photodetectors 162 and 163 (collectively referred to as "MPD.1$b$") are summed up, and the total value is input as the first monitor value to the I/V converter 21A of the control circuit 20.

The total of the signal lights of wavelength $\lambda 1$ extracted from the second AMZ interferometer 132 of the first optical demultiplexing circuit 11A and from the second AMZ interferometer 142 of the second optical demultiplexing circuit 12A is detected by the $\lambda 1$ photodetector 17. The total of the signal lights of wavelength $\lambda 2$ extracted from the third AMZ interferometer 133 of the first optical demultiplexing circuit 11A and from the third AMZ interferometer 143 of the second optical demultiplexing circuit 12A is detected by the $\lambda 2$ photodetector 18. The detected signal lights of $\lambda 1$ and $\lambda 2$ are processed by a signal processor at the subsequent stage.

The control circuit 20A controls the wavelength characteristics of the first AMZ interferometer 131 of the first optical demultiplexing circuit 11A and the first AMZ interferometer 141 of the demultiplexing circuit 12A, by means of the control direction determination unit 221A and the phase control units 222A and 223A which are implemented by the functions of the processor 22A. Specifically, the control signal 1$a$ output from the phase control unit 222A controls a phase shifter PS provided in the AMZ interferometer 131. The control signal 1$a$ includes a compensation for the initial deviation of the characteristic of the AMZ interferometer 131. The control signal 1$b$ output from the phase control unit 223A controls a phase shifter PS provided in the AMZ interferometer 141. The control signal 1$b$ includes a compensation for the initial deviation of the characteristic deviation of the AMZ interferometer 141. The control circuit 20A controls the phase of light in a direction that the first monitor value increases by the control signals 1$a$ and 1$b$.

The control illustrated in FIG. 3A is a control for increasing the peak powers at the wavelengths $\lambda 1$ and $\lambda 2$. The center wavelength of the peak of the transmission spectrum whose peak is located near $\lambda 1$ is brought closer to $\lambda 1$, and the center wavelength of the peak of the transmission spectrum whose peak is located near λ2 is brought closer to λ2, thereby increasing the peak intensities of the both wavelengths.

Because the sum of the optical powers monitored at the same positions in the first optical demultiplexing circuit 11A and the second optical demultiplexing circuit 12A which have the same configuration is used, stable monitoring results can be acquired, regardless of the polarization state in the optical fiber 31. This configuration can improve the accuracy of control on the wavelength characteristics of the AMZ interferometers 131 and 141.

FIG. 3B illustrates control on the wavelength characteristics of the second AMZ interferometer 132 of the first optical demultiplexing circuit 11A and the second AMZ interferometer 142 of the second optical demultiplexing circuit 12A. The second AMZ interferometer 132 of the first optical demultiplexing circuit 11A is referred to as "AMZ.2a", and the second AMZ interferometer 142 of the second optical demultiplexing circuit 12A is referred to as "AMZ.2b".

In the second AMZ interferometer 132, the monitor photodetector 151 is connected to an output port, which is provided on the other side of a signal light output port of wavelength λ1. Ideally, only the signal light of wavelength λ1 is extracted from the second AMZ interferometer 132. However, due to the influence of changes in the refractive index caused by manufacturing errors, environmental changes, etc., other wavelength components may be contained in the transmission spectrum having a peak at λ1. The monitor photodetector 151 is used to detect other wavelength components included in the transmission spectrum incident on the second AMZ interferometer 132. This monitor photodetector 151 is referred to as "MPD.2a".

Also in the second optical demultiplexing circuit 12A, the ideal is that only the signal light of wavelength λ1 is extracted from the second AMZ interferometer 142. However, the transmission spectrum with a peak at λ1 may contain other wavelength components due to the influence of changes in the refractive index caused by manufacturing errors, environmental changes, etc. The monitor photodetector 161 is used to detect other wavelength components included in the transmission spectrum incident on the second AMZ interferometer 142. This monitor photodetector 161 is referred to as "MPD.2b".

The output of the monitor photodetector 151 (i.e., "MPD.2a") and the output of the monitor photodetector 161 (i.e., "MPD.2b") are summed up, and the total is input as the second monitor value to the I/V converter 21A of the control circuit 20A.

The control circuit 20A controls the wavelength characteristics of the AMZ interferometer 132 and the AMZ interferometer 142, by means of the control direction determination unit 221A and the phase control units 222A and 223A which are implemented as the functions of the processor 22A. Specifically, the control signal 2a output from the phase control unit 222A controls a phase shifter PS provided in the AMZ interferometer 132. The control signal 2a includes a compensation for the initial deviation of the characteristic of the AMZ interferometer 132. The control signal 2b output from the phase control unit 223A controls a phase shifter PS provided in the AMZ interferometer 142. The control signal 2b includes a compensation for the initial deviation of the characteristic of the AMZ interferometer 142. The control circuit 20A controls the phase of light in a direction that the second monitor value decreases by the control signals 2a and 2b.

The control illustrated in FIG. 3B is a control for reducing the side lobe of the transmission spectrum having a peak at λ1. Because the sum of the optical powers monitored at the same positions in the first optical demultiplexing circuit 11A and the second optical demultiplexing circuit 12A having the same configuration is used, stable monitoring results can be acquired, regardless of the polarization state in the optical fiber 31, thereby improving the control accuracy on the wavelength characteristics of the AMZ interferometers 132 and 142.

FIG. 3C illustrates control on the wavelength characteristics of the third AMZ interferometer 133 of the first optical demultiplexing circuit 11A and the third AMZ interferometer 143 of the second optical demultiplexing circuit 12A. The third AMZ interferometer 133 of the first optical demultiplexing circuit 11A is referred to as "AMZ.3a", and the third AMZ interferometer 143 of the second optical demultiplexing circuit 12A is referred to as "AMZ.3b".

In the third AMZ interferometer 133, the monitor photodetector 154 is connected to an output port provided on the other side of the signal light output port of wavelength λ2. Ideally, only the signal light of wavelength λ2 is extracted from the third AMZ interferometer 133. However, due to the influence of changes in the refractive index caused by manufacturing errors, environmental changes, etc., other wavelength components may be contained in the transmission spectrum having a peak at λ2. The monitor photodetector 154 is used to detect other wavelength components included in the transmission spectrum incident on the AMZ interferometer 133. This monitor photodetector 153 is referred to as "MPD.3a".

Also in the second optical demultiplexing circuit 12A, the ideal is that only the signal light having a wavelength of λ2 is extracted from the third AMZ interferometer 143. The transmission spectrum with a peak at λ2 may contain other wavelength components due to the influence of changes in the refractive index caused by manufacturing errors, environmental changes, etc. The monitor photodetector 164 is used to detect other wavelength components included in the transmission spectrum incident on the AMZ interferometer 143. This monitor photodetector 164 is referred to as "MPD.3b".

The output of the monitor photodetector 154 (i.e., "MPD.3a") and the output of the monitor photodetector 164 (i.e., "MPD.3b") are summed up, and the total is input as the third monitor value to the I/V converter 21A of the control circuit 20A.

The control circuit 20A controls the wavelength characteristics of the AMZ interferometers 133 and 143, by means of the control direction determination unit 221A and the phase control units 222A and 223A which are implemented by the functions of the processor 22A. Specifically, the control signal 3a output from the phase control unit 222A controls a phase shifter PS provided in the AMZ interferometer 133. The control signal 3a includes a compensation for the initial deviation of the characteristic of the AMZ interferometer 133. The control signal 3b output from the phase control unit 223A controls a phase shifter PS provided in the AMZ interferometer 143. The control signal 3b includes a compensation for the initial deviation of the characteristic of the AMZ interferometer 143. The control circuit 20A controls the phase of light in a direction that the third monitor value decreases by the control signals 3a and 3b.

The control illustrated in FIG. 3C is a control for reducing the side lobe of the transmission spectrum having a peak at λ2. Because the sum of the optical powers monitored at the same positions in the first optical demultiplexing circuit 11A and the second optical demultiplexing circuit 12A having the same configuration is used, stable monitoring results can be acquired, regardless of the polarization state in the optical fiber 31. This configuration can improve the control accuracy on the wavelength characteristics of the AMZ interferometers 133 and 143.

When the controls illustrated in FIG. 3A to FIG. 3C are performed at the same time, three I/V converters 21A are provided corresponding to the first monitor value, the second monitor value, and the third monitor value. Three logical blocks inside the processor 22A may individually determine the control direction based on the first monitor value, the second monitor value, and the third monitor value.

FIG. 4 illustrates examples of initial value information 231A and 232A and an example of operation value information 233A, saved in the memory 23A. Initial value information items [1a], [1b], [2a] [2b], [3a], and [3b] used for initial correction are recorded in the initial value memory area of the memory 23A. The initial values [1a], [2a], and [3a] are for correcting the initial characteristics of the three AMZ interferometers 131, 132, and 133 (AMZ.1a, AMZ.2a, and AMZ.3a) of the first optical demultiplexing circuit 11A, and are saved as initial value information 231A. The initial values [1b], [2b] and [3b] are for correcting the initial characteristics of the first to third AMZ interferometers 141 to 143 (AMZ.1b to AMZ.3b) of the second optical demultiplexing circuit 12A, and are saved as the initial value information 232A.

Operating value information is recorded in the operating value memory area of the memory 23A. The operating value information includes an operating value [V1] for controlling the phase shifters PSs of the first AMZ interferometers 131 and 141, an operating value [V2] for controlling the phase shifters PSs of the second AMZ interferometers 132 and 142, and an operating value [V3] for controlling the phase shifters PSs of the third AMZ interferometers 133 and 143.

Figure 5A:
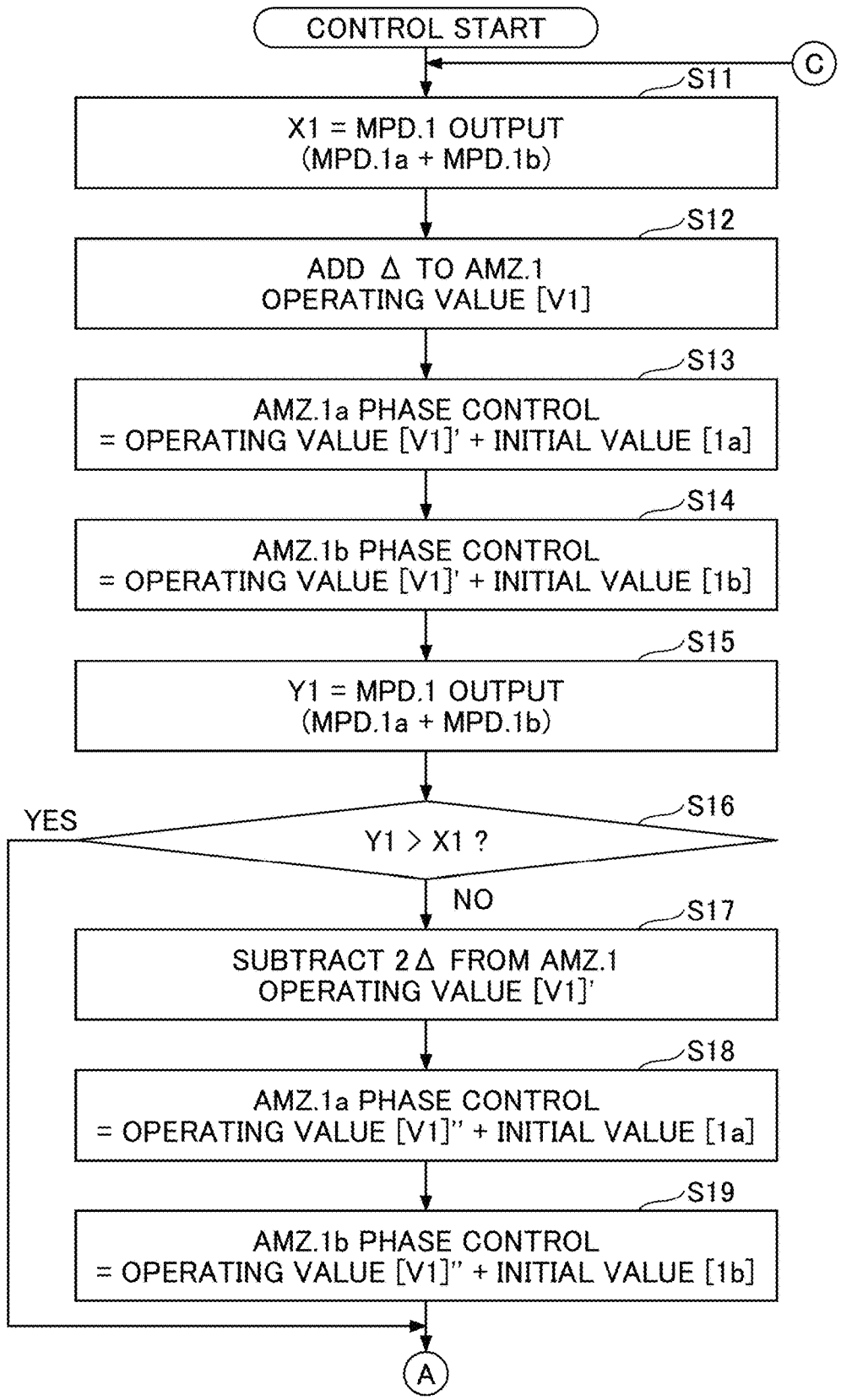
FIG. 5A is a flowchart of determining a control direction.
Figure 5B:
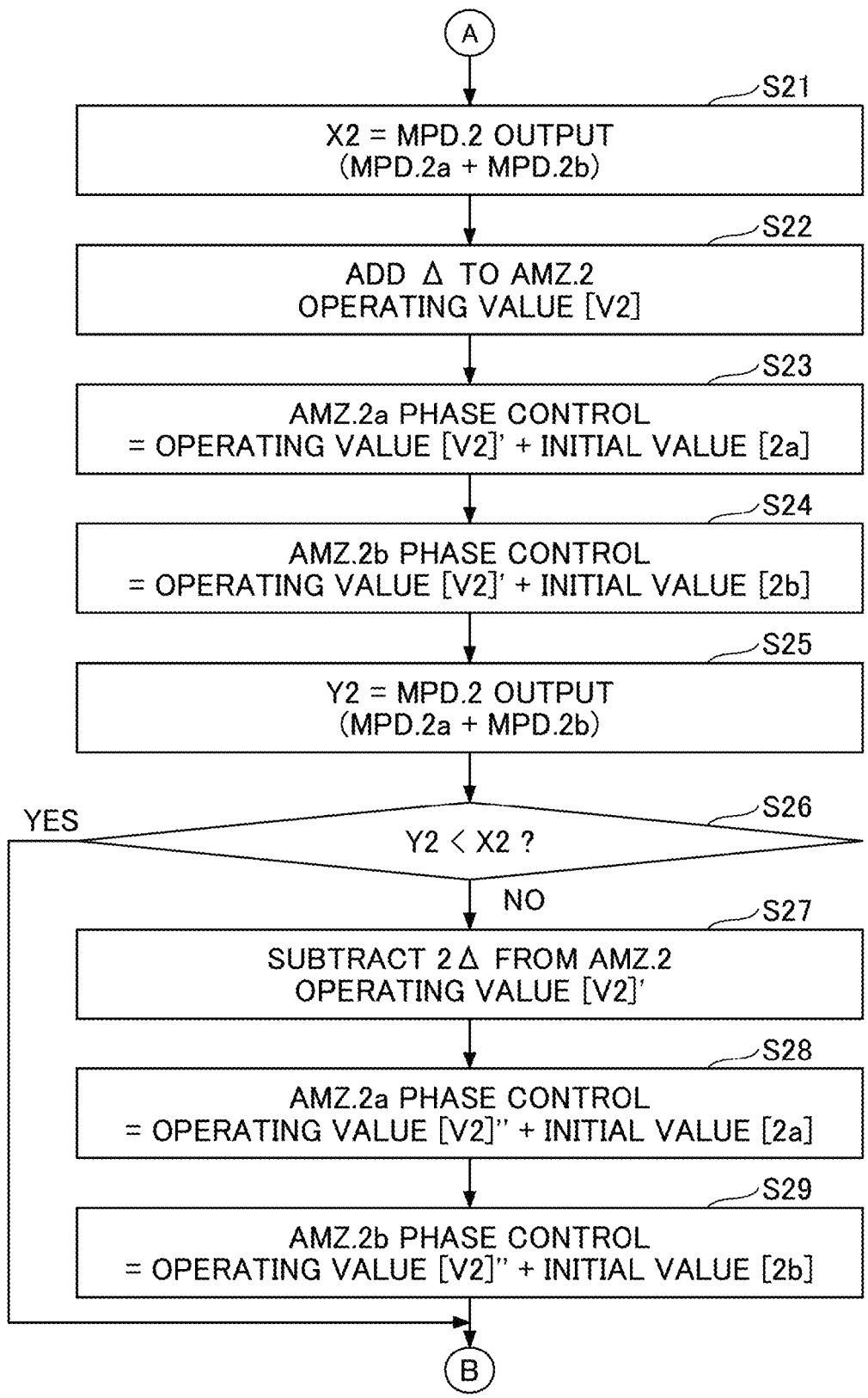
FIG. 5B is a flowchart of determining a control direction, performed following the operation flow of FIG. 5A.
Figure 5C:
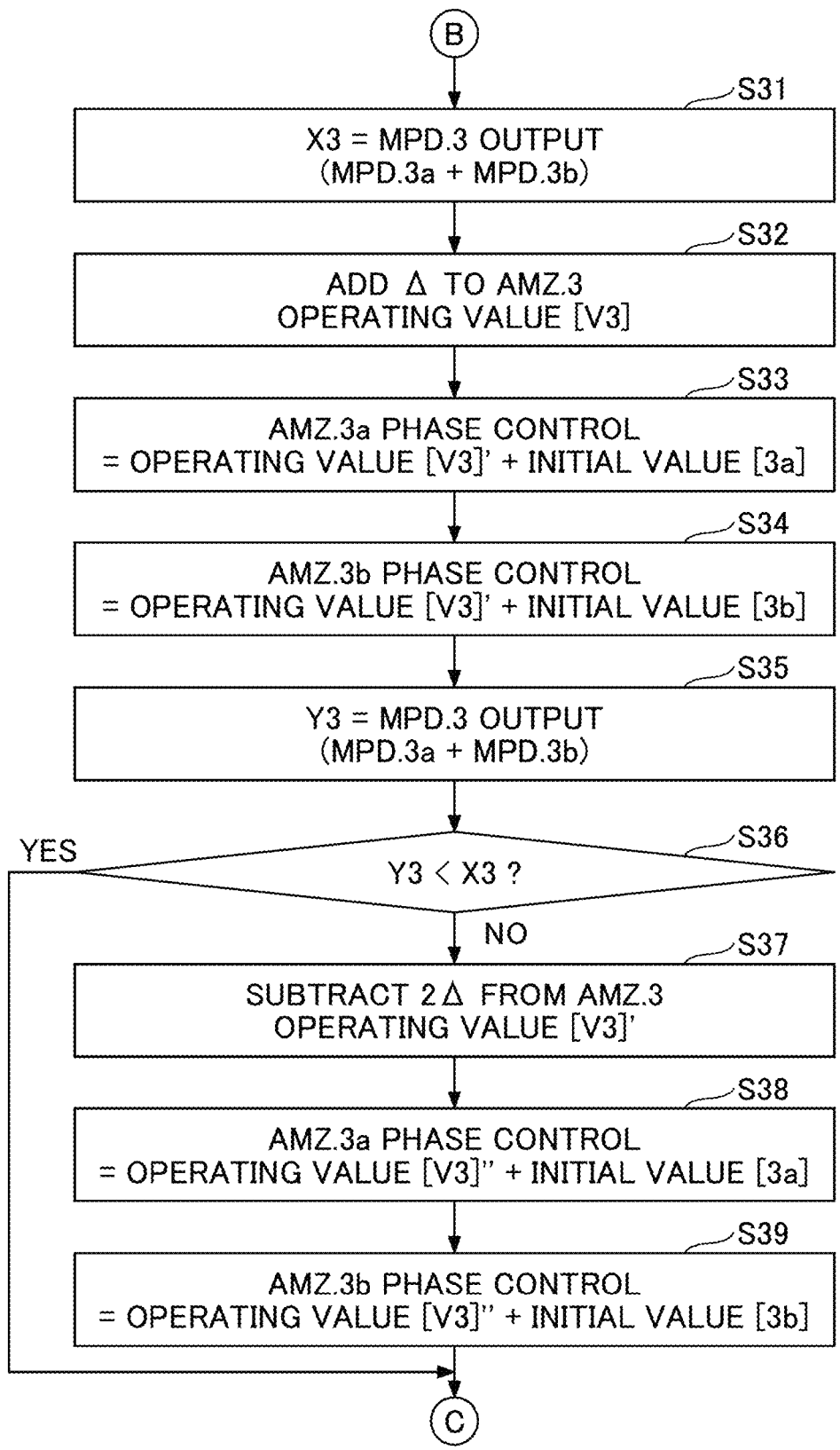
FIG. 5C is a flowchart of determining a control direction, performed following the operation flow of FIG. 5B.

FIG. 5A to FIG. 5C are flowcharts of wavelength characteristic control using initial value information and operating value information. These control flows are executed by the processor 22A of the control circuit 20A. In the flowcharts of FIG. 5A to FIG. 5C, tuning of the three AMZ interferometers constituting one unit circuit 13A or 14A is sequentially illustrated for convenience of illustration and explanation. However, in actual operations, tuning of the three AMZ interferometers composing one unit circuit 13A or 14A may be simultaneously performed in parallel.

FIG. 5A illustrates a process of increasing the peak levels of the target wavelengths λ1 and λ2. The processor 22A acquires a first monitor value X1 (S11). The first monitor value X1 represents the total of the monitoring result from the monitor photodetectors 152 and 153 (i.e., "MPD.1a") of the first optical demultiplexing circuit 11A and the monitoring result from the monitor photodetectors 162 and 163 (i.e., "MPD.1b") of the second optical demultiplexing circuit 12A. Then, the operating value [V1] for the first AMZ interferometer 131 and 141 is increased by a predetermined step size Δ (S12).

Using the incremented operating value [V1]' to which Δ has been added, and the initial value [1a], the phase shifter PS of the first AMZ interferometer 131 ("AMZ.1a") of the first optical demultiplexing circuit 11A is controlled (S13). The initial value [1a] is a value set in advance in the AMZ interferometer 131 in order to compensate for or cancel the characteristic deviation or variation among the AMZ interferometers due to manufacturing errors or the like.

Similarly, using the incremented operating value [V1]' to which Δ has been added, and the initial value [1b], the phase shifter PS of the first AMZ interferometer 141 ("AMZ.1b") of the second optical demultiplexing circuit 12A is controlled (S14). The initial value [1b] is a value set in advance in the AMZ interferometer 141 in order to compensate for or cancel the characteristic deviation or variation among the AMZ interferometers due to a manufacturing error or the like. Steps S13 and S14 may be performed simultaneously, or in any order.

Then, a first monitor value Y1 is acquired after the phase adjustment (S15). This first monitor value Y1 represents the sum of the monitoring result from the monitor photodetectors 152 and 153 ("MPD.1a") of the first optical demultiplexing circuit 11A, and the monitoring result from the monitor photodetectors 162 and 163 ("MPD.1b") of the second optical demultiplexing circuit 12A, acquired after the phase adjustment.

It is determined whether the first monitor value Y1 after the phase adjustment is greater than the previous first monitor value X1 (S16). If the currently acquired first monitor value Y1 is greater than the previously acquired first monitor value X1 (Yes in S16), then the process proceeds to control on the second AMZ interferometer illustrated in FIG. 5B. If the first monitor value Y1 is not greater than the previous first monitor value X1 (No in S16), the control direction may not be correct. In this case, the operating value [V1] for the first AMZ interferometers 131 and 141 is decreased by 2Δ (S17).

Using the updated operating value [V1]" reduced by 2Δ and the initial value [1a], the phase of the first AMZ interferometer 131 ("AMZ.1a") of the first optical demultiplexing circuit 11A is controlled (S18). Similarly, using the updated operating value [V1]" reduced by 2Δ and the initial value [1b], the phase of the first AMZ interferometer 141 ("AMZ.1b") of the second optical demultiplexing circuit 12A is controlled (S19). Subsequently, the process proceeds to control on the second AMZ interferometer illustrated in FIG. 5B.

FIG. 5B illustrates a process continued from the node A of FIG. 5A. The process in FIG. 5B is a control for reducing the side lobe of the target wavelength λ1. The processor 22A acquires the second monitor value X2 (S21). The second monitor value X2 represents the sum of the monitoring result of the monitor photodetector 151 ("MPD.2a") of the first optical demultiplexing circuit 11A and the monitoring result of the monitor photodetector 161 ("MPD.2b") of the second optical demultiplexing circuit 12A. Then, the operating value [V2] for the second AMZ interferometers 132 and 142 is increased by a predetermined step size Δ (S22). The step size Δ for changing (increasing or decreasing) the operating value [V2] may be the same as or different from the step size Δ for increasing or decreasing the operating value [V1].

Using the updated operating value [V2]' to which Δ has been added, and the initial value [2a], the phase shifter PS of the second AMZ interferometer 132 ("AMZ.2a") of the first optical demultiplexing circuit 11A is controlled (S23). The initial value [2a] is a value set in advance in the AMZ interferometer 132 in order to compensate for or cancel the characteristic deviation or variation among the AMZ interferometers due to a manufacturing error or the like.

Similarly, the phase shifter PS of the second AMZ interferometer 142 ("AMZ.2b") of the second optical demultiplexing circuit 12A is controlled using the initial value [2b] and the updated operating value [V2]' to which Δ has been added (S24). The initial value [2b] is a value set in advance in the AMZ interferometer 142 in order to compensate for or cancel the characteristic deviation or variation among the AMZ interferometers due to a manufacturing error or the like. Steps S23 and S24 may be performed simultaneously, or in any order.

Then, a second monitor value Y2 is acquired after the phase adjustment (S25). This monitor value Y2 represents the sum of the monitoring result of the monitor photodetector 151 ("MPD.2a") of the first optical demultiplexing circuit 11A and the monitoring result of the monitor photodetector 161 ("MPD.2b") of the second optical demultiplexing circuit 12A, acquired after the phase adjustment.

It is determined whether the second monitor value Y2 after the phase adjustment is smaller than the previous second monitor value X2 (S26). If the current second monitor value Y2 is smaller than the previous second monitor value X2 (Yes in S26), the process proceeds to the control on the third AMZ interferometer illustrated in FIG. 5C. If the second monitor value Y2 is not smaller than the previous second monitor value X2 (No in S26), the control direction may not be correct. In this case, the operating value [V2]' for the second AMZ interferometers 132 and 142 is decreased by 2Δ (S27).

Using the updated operating value [V2]" reduced by 2Δ and the initial value [2a], the phase shifter PS of the second AMZ interferometer 132 ("AMZ.2a") of the first optical demultiplexing circuit 11A is controlled (S28). Similarly, using the operating value [V2]" reduced by 2Δ and the initial value [2b], the phase shifter PS of the second AMZ interferometer 142 ("AMZ.2b") of the second optical demultiplexing circuit 12A is controlled (S29). Subsequently, the process proceeds to control on the third AMZ interferometer illustrated in FIG. 5C.

FIG. 5C illustrates a process continued from the node B of FIG. 5B. FIG. 5C is a control for reducing the side lobe of the target wavelength λ2. The processor 22A acquires the third monitor value X3 (S31). The third monitor value X3 represents a sum of the monitoring result of the monitor photodetector 154 ("MPD.3a") of the first optical demultiplexing circuit 11A and the monitoring result of the monitor photodetector 164 ("MPD.3b") of the second optical demultiplexing circuit 12A.

Then, the operating value [V3] of the third AMZ interferometer 133 and 143 is increased by a predetermined step size Δ (S32). The step size Δ for increasing or decreasing the operating value [V3] may be the same as or different from the step size Δ for increasing or decreasing the operating value [V2], and it may be the same as or different from the step size Δ for increasing or decreasing the operating value [V1].

Using the updated operating value [V3]' to which Δ has been added and the initial value [3a], the phase shifter PS of the third AMZ interferometer 133 ("AMZ.3a") of the first optical demultiplexing circuit 11A is controlled (S33). The initial value [3a] is a value set in advance in the AMZ interferometer 133 in order to compensate for or cancel the characteristic deviation or variation among the AMZ interferometers due to a manufacturing error or the like.

Similarly, using the updated operating value [V3]' to which Δ has been added and the initial value [3b], the phase shifter PS of the third AMZ interferometer 143 ("AMZ.3b") of the second optical demultiplexing circuit 12A is controlled (S34). The initial value [3b] is a value set in advance in the AMZ interferometer 143 in order to compensate or cancel the characteristic deviation or variation among the AMZ interferometers due to a manufacturing error or the like. Steps S33 and S34 may be performed simultaneously, or in any order.

Then a third monitor value Y3, which is a total of the monitoring results of "MPD.3a" and "MPD.3b" after the phase adjustment, is acquired (S35), and it is determined whether Y3 is smaller than the previously acquired third monitor value X3 (S36). If the third monitor value Y3 is smaller than the previous third monitor value X3 (Yes in S36), the process returns to FIG. 5A, and the processes of FIG. 5A to FIG. 5C are repeated. If the third monitor value Y3 is not smaller than the previous third monitor value X3 (No in S36), the control direction may not be correct. In this case, the operating value [V3]' of the third AMZ interferometers 133 and 143 is reduced by 2Δ (S37).

Using the updated operating value [V3]" reduced by 2Δ and the initial value [3a], the phase of the third AMZ interferometer 133 ("AMZ.3a") of the first optical demultiplexing circuit 11A is controlled (S38). Similarly, using the operating value [V3]" reduced by 2Δ and the initial value [3b], the phase of the third AMZ interferometer 143 ("AMZ.3b") of the second optical demultiplexing circuit 12A is controlled (S39). Subsequently, the process returns to FIG. 5A, and the processes of FIG. 5A to FIG. 5C are repeated.

Even if the environment changes during the service, the wavelength characteristics of the first optical demultiplexing circuit 11A and the second optical demultiplexing circuit 12A of the photonic circuit 10A can be controlled so as to follow the environmental change by repeating the control operations of FIG. 5A to FIG. 5C.

Figure 6:
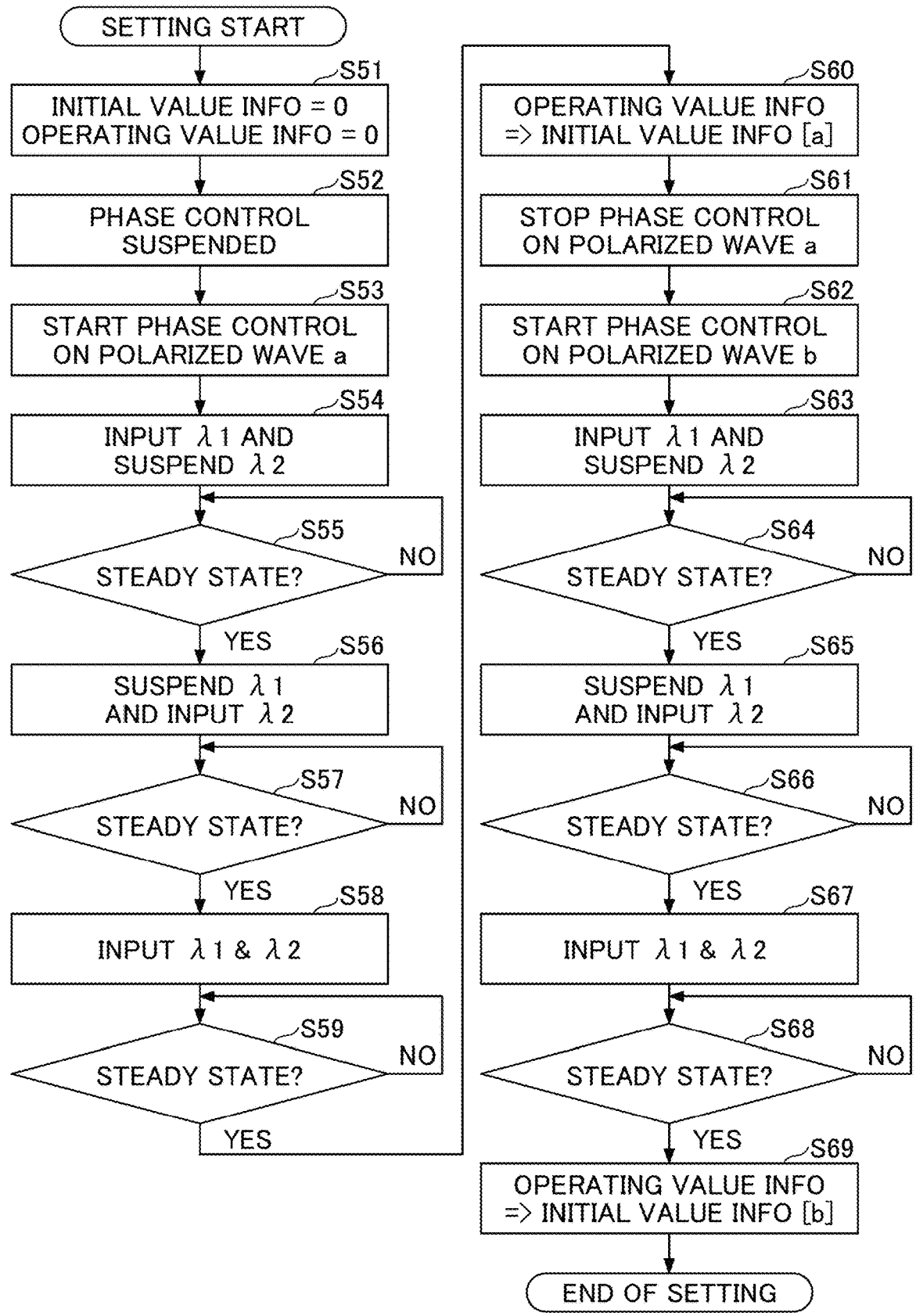
FIG. 6 is a flowchart of setting an initial value.

FIG. 6 is a flowchart of setting the initial value. The control process illustrated in FIG. 5A to 5C is a control performed during the actual demultiplexing in service, in which the wavelength characteristics of the first AMZ interferometers 131 and 132, the second AMZ interferometers 132 and 142, and the third AMZ interferometers 133 and 143 are simultaneously or sequentially controlled using the preset initial values, while compensating for the characteristic deviation or variation among the AMZ interferometers. When the initial value is set in FIG. 6, a light beam containing approximately the same quantities of two orthogonal polarization components, such as random polarized waves or circularly polarized waves, is input as a test light. Phase adjustment is performed individually for the first optical demultiplexing circuit 11A and the second optical demultiplexing circuit 12A. Light of λ1 and light of λ2 are successively incident on each of the first optical demultiplexing circuit 11A and the second optical demultiplexing circuit 12A for the phase adjustment. Subsequently, the lights of λ1 and λ2 may be introduced at the same time to determine an ultimate initial value.

First, the initial value information and the operating value information are initialized (S51). At this point of time, the phase control operation is suspended (S52). Then, one of the optical demultiplexing circuits which deals with either one of the polarizations is adjusted (S53). The polarized wave "a" is, for example, TE polarization contained in the incident light on the photonic circuit 10A. The first optical demultiplexing circuit 11A is to be adjusted first. During the adjustment of the first optical demultiplexing circuit 11A, phase adjustment of the second optical demultiplexing circuit 12A is not performed.

Only the light of λ1 is introduced into the photonic circuit 10A, and incidence of λ2 light is stopped (S54). The phase shifters PSs of all the AMZ interferometers located between the first input port for inputting the λ1 light and the last output port for outputting the λ1 light in the unit circuit 13A are controlled, until the output light of λ1 becomes the steady state (the loop of "No" in S55). This example focuses on the TE polarization, namely, the first optical demultiplexing circuit 11A. Accordingly, the first input port of the unit circuit 13A to which λ1 is input is the input side coupler of the first AMZ interferometer 131, and the last output port from which λ1 is output is a signal light output port of the second AMZ interferometer 132. The phase shifters PSs of the first AMZ interferometer 131 and the second AMZ interferometer 132 are controlled. The stability of the output light of λ1 can be determined by monitoring the output of the monitor photodetector 152 or the output of the λ1 photodetector 17.

When the output of λ1 becomes a steady state (Yes in S55), the incidence of the λ1 light is stopped and the light of λ2 is introduced (S56). The phase shifters PSs of all the AMZ interferometers located between the first input port for inputting the λ2 light and the last output port for outputting the λ2 light are controlled, until the output light of λ2 becomes a steady state (the loop of "No" in S57). The first input port of the unit circuit 13A to which λ2 is input is the input side coupler of the first AMZ interferometer 131. The last output port from which λ2 is output is the signal light output port of the third AMZ interferometer 133. Therefore, the phase shifters of the first AMZ interferometer 131 and the third AMZ interferometer 133 are controlled. The stability of the λ2 light is determined by monitoring the output of the monitor photodetector 153 or the output of the λ2 photodetector 18.

When the output of λ2 becomes a steady state (Yes in S57), the light of λ1 and the light of λ2 are simultaneously input (S58), and the phase shifters PSs of all the AMZ interferometers through which the λ1 light and the λ2 light travel are controlled, until the lights become in the steady states (the loop of "No" in S59). When the output levels of the λ1 light and the λ2 light become steady states (Yes in S59), the operating values [V1], [V2], and [V3] at that time are written as the initial values [1a], [2a], and [3a] of the AMZ interferometers 131, 132, and 133 (S60). Then, the initial phase control on the polarization "a", namely, the first optical demultiplexing circuit 11A is terminated (S61), and initial phase control on the polarization "b", namely, the second demultiplexing circuit 12A which deals with the TE polarization obtained by rotating the polarization plane of the TM polarization is started (S62).

First, only the light of λ1 is introduced into the photonic circuit 10A, and incidence of light of λ2 is suspended (S63). The phase shifters PSs of all the AMZ interferometers located between the first input port where λ1 is input and the last output port where λ1 is output in the unit circuit 14A are controlled, until the output light of λ1 becomes a steady state (the loop of "No" in S64). In this example, the phase shifters of the first AMZ interferometer 141 and the second AMZ interferometer 142 are controlled.

When the output of λ1 becomes a steady state (Yes in S64), the incidence of the λ1 light is suspended, and λ2 light is introduced (S65). The phase shifters PSs of all the AMZ interferometers located between the first input port where λ2 is input and the last output port where λ2 is output in the unit circuit 14A are controlled, until the output of the λ2 light becomes a steady state (the loop of "No" in S66). In this example, the phase shifters of the first AMZ interferometer 141 and the third AMZ interferometer 143 are controlled.

When the output of λ2 becomes a steady state (Yes in S66), the light of λ1 and the light of λ2 are simultaneously introduced (S67), and the phase shifters of all the AMZ interferometers through which the λ1 light and the λ2 light travel in the unit circuit 14A are controlled, until the output lights become in the steady states (the loop of "No" in S68). When the outputs of the λ1 light and the λ2 light become steady states (S68), the operating values [V1], [V2], and [V3] at that time are written as the initial values [1b], [2b], and [3b] of the AMZ interferometers 141, 142, and 143 (S69). Then, the setting of the initial values is terminated.

By setting the initial values as described above, variation in the initial characteristics of the AMZ interferometers, which are fabricated as minute silicon photonics devices, can be compensated for or cancelled.

<Modified Example of Totalizing Monitoring Results>

Figure 7:
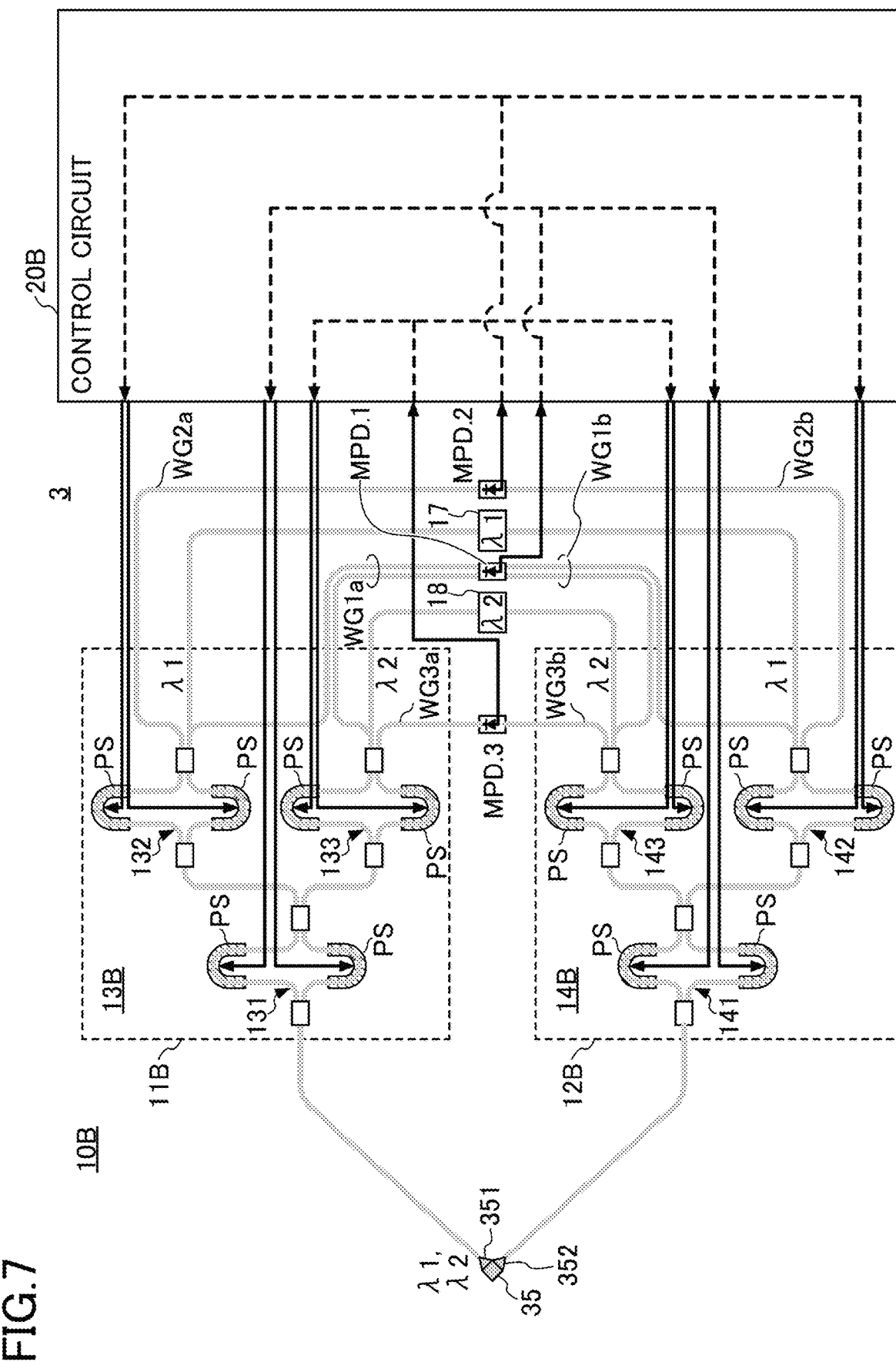
FIG. 7 illustrates a configuration example of a wavelength demultiplexer that optically combine output powers of monitored lights.

FIG. 7 illustrate a configuration example of a wavelength demultiplexer 3 which optically sums up the powers of the monitored lights. The wavelength demultiplexer 3 has a photonic circuit 10B which includes a first optical demultiplexing circuit 11B, a second optical demultiplexing circuit 12B, and a control circuit 20B that controls the demultiplexing operations of the photonic circuit 10B.

In the wavelength demultiplexer 2 illustrated in FIG. 3A to FIG. 3C, the total of eight monitor photodetectors are used, four on the output side of the unit circuit 13A, and four on the output side of the unit circuit 14A. The total photocurrent is supplied to the control circuit 20A. In FIG. 7, the light beams output from the same positions of the first optical demultiplexing circuit 11B and the second optical demultiplexing circuit 12B are guided to the same monitor photodetector, at which the output light beams are optically added and detected.

Separation of two wavelengths λ1 and λ2 is described as an example. In the photonic circuit 10B, a two-dimensional grating coupler 35 is used as an interface with the optical fiber, in place of the edge coupler 32. The input light is incident onto the circuit at an angle perpendicular or oblique to the surface of the circuit. The two-dimensional grating coupler 35 has a plurality of light scatterers arranged in, for example, a matrix at the intersection of the tapered waveguides 351 and 352 extending in the directions of the first light demultiplexing circuit 11B and the second light demultiplexing circuit 12B, respectively. The two-dimensional grating coupler 35 can extract two orthogonal polarizations as two TE polarizations, and accordingly, a polarization beam splitter or a polarization rotator is unnecessary. If edge connection is desirable depending on the configuration, the edge coupler 32 may be used, as illustrated in FIG. 3A to FIG. 3C.

In the unit circuit 13B, the waveguide WG1a, which includes a waveguide branched from the signal light output port of λ1 of the second AMZ interferometer 132 and a waveguide branched from the signal light output port of λ2 of the third AMZ interferometer 133, is connected to a monitor photodetector MPD.1. In the unit circuit 14B, the waveguide WG1b, which includes a waveguide branched from the signal light of λ1 of the second AMZ interferometer 142 and a waveguide branched from the output signal light of λ2 of the third AMZ interferometer 143, is also connected to the monitor photodetector MPD.1. The optical power obtained from the monitor photodetector MPD.1 is the total monitor power used for phase adjustment of the first AMZ interferometer 131 of the unit circuit 13B and the first AMZ interferometer 141 of the unit circuit 14B.

At the second AMZ interferometer 132 of the unit circuit 13B, the other output port provided on the other side of the signal light output port of λ1 leads to a waveguide WG2a, which is connected to the monitor photodetector receiver MPD.2. At the second AMZ interferometer 142 of the unit circuit 14B, the other output port provided on the other side of the signal light output port of λ1 leads to a waveguide WG2b, which is also connected to the monitor photodetector MPD.2. The optical power obtained from the MPD.2 is the total optical power used for the phase adjustment of the second AMZ interferometers 132 and 142.

At the third AMZ interferometer 133 of the unit circuit 13B, the other output port provided on the other side of the signal light output port of λ2 leads to a waveguide WG3a, which is connected to the monitor photodetector MPD.3. At the third AMZ interferometer 143 of the unit circuit 14B, the other output port provided on the other side of the signal light output port of λ2 leads to a waveguide WG3b, which is also connected to the monitor photodetector MPD.3. The optical power obtained from the monitor photodetector MPD.3 is the total monitor power used for the phase adjustment of the third AMZ interferometers 133 and 143.

The phase adjustment using the outputs from the monitor photodetectors MPD.1, MPD.2, and MPD.3 is the same as that described with reference to FIG. 5A to 5C. The signal light of λ1 output from the AMZ interferometer 132 of the unit circuit 13B and the signal light of λ1 output from the AMZ interferometer 142 of the unit circuit 14B are detected by the photodetector 17 for λ1, and the detected signal is processed in the subsequent stage. The signal light of λ2 output from the AMZ interferometer 133 of the unit circuit 13B and the signal light of λ2 output from the AMZ interferometer 143 of the unit circuit 14B are detected by the photodetector 18 for λ2, and the detected signal is processed in the subsequent stage.

The configuration of FIG. 7 can achieve phase adjustment using only three monitor photodetectors in the photonic circuit 10B used for separation of two wavelengths. Compared with the configurations of FIG. 3A to FIG. 3C, the number of monitor photodetectors can be reduced to less than half. By configuring the first optical demultiplexing circuit 11B and the second optical demultiplexing circuit 12B in a mirror symmetry, the waveguides WG1a, WG1b, WG2a, WG2b, WG3a, and WG3b can be connected to the associated monitor photodetectors without crossing one another.

<Separation of 4 Wavelengths>

FIG. 8 is a schematic diagram of a photonic circuit 10C that separates four wavelengths. The photonic circuit 10C includes a first optical demultiplexing circuit 11C and a second optical demultiplexing circuit 12C having the same configuration, but arranged mirror-symmetrically.

The first optical demultiplexing circuit 11C has three unit circuits 13C-1, 13C-2, and 13C-3 connected in a tree structure. The second optical demultiplexing circuit 12C has three unit circuits 14C-1, 14C-2, and 14C-3 connected in a tree structure.

Each of the unit circuits 13C-1, 13C-2, and 13C-3 has the same structure as the unit circuits 13A and 13B, in which three AMZ interferometers are connected in a tree. Each of the unit circuits 14C-1, 14C-2, and 14C-3 has the same structure as the unit circuits 14A and 14B, in which three AMZ interferometers are connected in a tree.

From the two-dimensional grating coupler 36 provided on the surface of the photonic circuit 10C, a WDM signal which contains multiplexed signal lights of λ1, λ2, λ3, and λ4 is input to the photonic circuit 10C. By means of the two-dimensional grating coupler 36, the TE-polarized wave and the TM-polarized wave orthogonal to each other are guided as two TE polarized waves to the first optical demultiplexing circuit 11C and the second optical demultiplexing circuit 12C.

The unit circuit 13C-1 transmits a transmission spectrum having peaks at λ1 and λ3 through to the unit circuit 13C-2, and transmits a transmission spectrum having peaks at λ2 and λ4 through to the unit circuit 13C-3. The signal light of λ1 and the signal light of λ3 are output from the two AMZ interferometers of the second-stage unit circuit 13C-2, respectively. The signal light of λ2 and the signal light of λ4 are output from the two AMZ interferometers of the second-stage unit circuit 13C-3, respectively.

The unit circuit 14C-1 transmits a transmission spectrum having peaks at λ1 and λ3 through to the unit circuit 14C-2, and transmits a transmission spectrum having peaks at λ2 and λ4 through to the unit circuit 14C-3. The signal light of λ1 and the signal light of λ3 are output from the two AMZ interferometers, respectively, provided in the second-stage unit circuit 14C-2. The signal light of λ2 and the signal light of λ4 are output from the two AMZ interferometers, respectively, provided in the second-stage unit circuit 14C-3.

The light of λ1 separated by the unit circuit 13C-2 and the light of λ1 separated by the unit circuit 14C-2 are detected by the photodetector 17 for λ1. The detected λ1 signal undergoes signal processing in the subsequent stage. The light of λ3 separated by the unit circuit 13C-2 and the light of λ3 separated by the unit circuit 14C-2 are detected by the photodetector 27 for λ3. The detected λ3 signal undergoes signal processing in the subsequent stage.

The light of λ2 separated by the unit circuit 13C-3 and the light of λ2 separated by the unit circuit 14C-3 are detected by the photodetector 18 for λ2, and the detected λ2 signal undergoes signal processing in the subsequent stage. The light of λ4 separated by the unit circuit 13C-3 and the light of λ4 separated by the unit circuit 14C-3 are detected by the photodetector 28 for λ4, and the detected λ4 signal undergoes signal processing in the subsequent stage.

The photonic circuit 10C has nine monitor photodetectors MPDs, each of which is connected commonly to waveguides extending from the same positions of the first optical demultiplexing circuit 11C and the second optical demultiplexing circuit 12C. Monitor photodetector MPD.C1 monitors a portion of the transmission spectrum having peaks of all the wavelengths and extracted from the unit circuit 13C-1, and a portion of the transmission spectrum having peaks of all the wavelengths and extracted from the unit circuit 14C-1. The monitoring result of the monitor photodetector MPD.C1 is used to control the wavelength characteristic of the first AMZ interferometer of the unit circuit 13C-1, and the wavelength characteristic of the first AMZ interferometer of the unit circuit 14C-1.

Monitor photodetector MPD.C2 monitors a portion of the transmission spectrum having peaks at λ1 and λ3 and extracted from the unit circuit 13C-2, and a portion of the transmission spectrum having peaks at λ1 and λ3 and extracted from the unit circuit 14C-2. The monitoring result of the monitor photodetector MPD.C2 is used to control the wavelength characteristic of the first AMZ interferometer of the unit circuit 13C-2, and the wavelength characteristic of the first AMZ interferometer of the unit circuit 14C-2.

Monitor photodetector MPD.C3 monitors a portion of the transmission spectrum having peaks at λ2 and λ4 and extracted from the unit circuit 13C-3, and a portion of the transmission spectrum having peaks at λ2 and λ4 and extracted from the unit circuit 14C-3. The monitoring result of the monitor photodetector MPD.C3 is used to control the wavelength characteristic of the first AMZ interferometer of the unit circuit 13C-3, and the wavelength characteristic of the first AMZ interferometer of the unit circuit 14C-3.

In addition to the monitor photodetectors MPD.C1, MPD.C2 and MPD.C3, monitor photodetectors MPD.4 to MPD.9 are provided. Each of the MPD.4 to MPD.9 is connected to two waveguides extending from the same positions of the first optical demultiplexing circuit 11C and the second optical demultiplexing circuit 12C, so as to monitor the total optical power. The way of performing the phase control on each of the AMZ interferometers using the total monitor power detected by the associated monitor photodetector is the same as that described with reference to FIG. 5A to FIG. 5C.

If the configuration of FIG. 3A to FIG. 3C is employed to merge photocurrents for separation of 4 wavelengths, a total of 24 monitor photodetectors are required. By employing the configuration of FIG. 8 in which the monitored light components are optically added up, the number of monitor photodetectors can be reduced to about one third (⅓). The configuration of FIG. 8 can achieve separation of four wavelengths, while reducing the influence of polarization.

<Application to Optical Transceiver Frontend Module>

FIG. 9 is a schematic diagram of an optical transceiver front-end module 100 to which the wavelength demultiplexer of an embodiment is applied. The optical transceiver front-end module 100 is, for example, a 4-channel WDM transceiver front-end module. The optical transceiver front-end module 100 includes an optical transmitter front-end circuit TX and an optical receiver front-end circuit RX. The optical transmitter front-end circuit TX includes lasers 2011, 2012, 2013 and 2014, modulators 2031, 2032, 2033 and 2034, and driver circuits 2021, 2022, 2023 and 2024. The lasers 2011 to 2014 output light beams of the respective wavelengths. The driver circuits 2021 to 2024 drive the associated modulators 2031 to 2034. The optical transmitter front-end circuit TX also has a photonic circuit 250 for multiplexing light signals of multiple wavelengths. The four optical signals having different wavelengths and modulated by the modulators 2031, 2032, 2033, and 2034 are multiplexed by the photonic circuit 250 and output to the optical transmission line 102 through a connector 104. The optical transmission line 102 is, for example, a single mode fiber optic cable.

The optical receiver front-end circuit RX includes a wavelength demultiplexer 5 and an optical-to-electric converter (denoted as "O/E" in the FIG. 150. The wavelength demultiplexer 5 includes a photonic circuit 10C for wavelength demultiplexing, and a control circuit 20C for controlling the demultiplexing operation of the photonic circuit 10C. The photonic circuit 10C may be one illustrated in FIG. 8 adapted to separation of four wavelengths. The control circuit 20C controls the wavelength characteristics of the photonic circuit 10C, based on the total monitor power of the lights extracted from the same positions in the first optical demultiplexing circuit 11C and the second optical demultiplexing circuit 12C (see FIG. 8) of the photonic circuit 10C.

The photo receivers 111, 112, 113, and 114 used in the O/E converter 150 are, for example, photodiodes (PDs), which correspond to the photodetector 17 for λ1, the photodetector 18 for λ2, the photodetector 27 for λ3, and the photodetector 28 for λ4 illustrated in FIG. 8. The photocurrents output from the respective photo receivers are converted into voltage signals by the corresponding transimpedance amplifiers (TIAs) 121, 122, 123, and 124, and output to a signal processor of the subsequent stage.

By using the wavelength demultiplexer 5 in the optical transceiver front-end module 100, the influence of polarization is suppressed, and wavelength characteristic deviation due to manufacturing variation and environmental change is corrected. The optical signals of the respective wavelengths can be appropriately separated.

Although the specific configuration examples have been described above, the invention is not limited to the above-described examples. In all the configuration examples, a WDM signal may be introduced to the photonic circuit 10 (or 10A to 10C) using either the edge coupler 32 of a horizontal connection type or the two-dimensional grating coupler 35 of a vertical connection type. The phase shifter PS used in each AMZ interferometer may be provided to only one of the two waveguide arms of the AMZ interferometer. The control circuit 20 may be composed of a field programmable gate array or another logic device having a built-in memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. A wavelength demultiplexer comprising:
   a photonic circuit configured to convert two orthogonal polarized waves contained in incident light into two same polarized waves, the photonic circuit having a first optical demultiplexing circuit and a second optical demultiplexing circuit having a same configuration and provided for the two same polarized waves; and
   a control circuit configured to adjust wavelength characteristics of the first optical demultiplexing circuit and the second optical demultiplexing circuit,
   wherein the photonic circuit supplies a total output power of monitor lights extracted from same positions in the first optical demultiplexing circuit and the second optical demultiplexing circuit to the control circuit, and
   the control circuit controls a first wavelength characteristic of the first optical demultiplexing circuit and a second wavelength characteristic of the second optical demultiplexing circuit based on the total output power of the monitor lights.

2. The wavelength demultiplexer as claimed in claim 1, wherein the photonic circuit has a first monitor photodetector provided at a first position in the first optical demultiplexing circuit, and a second monitor photodetector provided at a second position in the second optical demultiplexing circuit, the second position in the second optical demultiplexing circuit corresponding to the first position in the first optical demultiplexing circuit, and
   wherein a total of an output current from the first monitor photodetector and an output current from the second monitor photodetector is supplied to the control circuit.

3. The wavelength demultiplexer as claimed in claim 1, wherein the photonic circuit has a monitor photodetector commonly connected to a monitor waveguide extending from a first monitoring position of the first optical demultiplexing circuit and a monitor waveguide extending from a second monitoring position of the second optical demultiplexing circuit, the second monitoring position in the second optical demultiplexing circuit corresponding to the first monitoring position in the first optical demultiplexing circuit, and wherein an output of the monitor photodetector is connected to an input of the control circuit.

4. The wavelength demultiplexer as claimed in claim 1, wherein the control circuit outputs a first control signal for controlling a wavelength characteristic of a first circuit section of the first optical demultiplexing circuit, and a second control signal for controlling a wavelength characteristic of a second circuit section of the second optical demultiplexing circuit, based on the total output power of monitor lights, the second circuit section of the second optical demultiplexing circuit corresponding to the first circuit section of the first optical demultiplexing circuit.

5. The wavelength demultiplexer as claimed in claim 4, wherein the control circuit has a memory that saves an initial value that compensates for a variation in initial characteristics between the first optical demultiplexing circuit and the second optical demultiplexing circuit, and wherein the control circuit generates the first control signal based on the total output power of the monitor lights and a first initial value for compensating for a characteristic deviation of the first optical demultiplexing circuit, and the second control signal based on the total output power of the monitor lights and a second initial value for compensating for a characteristic deviation of the second optical demultiplexing circuit.

6. The wavelength demultiplexer as claimed in claim 1, wherein the first optical demultiplexing circuit includes a first unit circuit having a tree structure in which two output ports of a first asymmetric Mach-Zehnder interferometer are connected to a second asymmetric Mach-Zehnder interferometer and a third asymmetric Mach-Zehnder interferometer, wherein the second optical demultiplexing circuit has a second unit circuit with a tree structure in which two output ports of a fourth asymmetric Mach-Zehnder interferometer are connected to a fifth asymmetric Mach-Zehnder interferometer and a sixth asymmetric Mach-Zehnder interferometer, and wherein the first unit circuit and the second unit circuit are provided mirror-symmetrically.

7. The wavelength demultiplexer as claimed in claim 6, wherein based on a total output power acquired from symmetrical positions of the second asymmetric Mach-Zehnder interferometer and the fifth asymmetric Mach-Zehnder interferometer, and a total monitor power acquired from symmetrical positions of the third asymmetric Mach-Zehnder interferometer and the sixth Mach-Zehnder interferometer, wavelength characteristics of the first asymmetric Mach-Zehnder interferometer and the fourth Mach-Zehnder interferometer are controlled.

8. The wavelength demultiplexer as claimed in claim 7, wherein the control circuit controls the wavelength characteristics of the first asymmetric Mach-Zehnder interferometer and the fourth Mach-Zehnder interferometer, using an initial value for compensating for a variation in initial characteristics between the first asymmetric Mach-Zehnder interferometer and the fourth asymmetric Mach-Zehnder interferometer.

9. An optical transceiver front-end module comprising:
the wavelength demultiplexer as claimed in claim 1; and an optical-to-electric converter configured to convert each of signal lights separated by the wavelength demultiplexer to an electric signal.

10. A photonic circuit that converts two orthogonal polarized waves contained in incident light into two same polarized waves, comprising:

a first optical demultiplexing circuit; and a second optical demultiplexing circuit having a same configuration with the first optical demultiplexing circuit, the first optical demultiplexing circuit and the second optical demultiplexing circuit being provided for the two same polarized waves, wherein the first optical demultiplexing circuit has a first unit circuit in which two output ports of a first asymmetric Mach-Zehnder interferometer are connected to a second asymmetric Mach-Zehnder interferometer and a third asymmetric Mach-Zehnder interferometer, and wherein the second optical demultiplexing circuit has a second unit circuit in which two output ports of a fourth asymmetric Mach-Zehnder interferometer are connected to a fifth asymmetric Mach-Zehnder interferometer and a sixth asymmetric Mach-Zehnder interferometer, the first unit circuit and the second unit circuit being provided mirror-symmetrically, wherein the photonic circuit further comprises a first monitor photodetector configured to receive a monitor light acquired from a first output port of the second asymmetric Mach-Zehnder interferometer and a first output port of the third asymmetric Mach-Zehnder interferometer, and a monitor light acquired from a first output port of the fifth asymmetric Mach-Zehnder interferometer and a first output port of the sixth asymmetric Mach-Zehnder interferometer, a second monitor photodetector connected to a second output port of the second asymmetric Mach-Zehnder interferometer and to a second output port of the fifth asymmetric Mach-Zehnder interferometer, and a third monitor photodetector connected to a second output port of the third asymmetric Mach-Zehnder interferometer and to a second output port of the sixth asymmetric Mach-Zehnder interferometer.

11. The photonic circuit as claimed in claim 10, comprising:

a first photodetector connected to the first output port of the second asymmetric Mach-Zehnder interferometer and to the first output port of the fifth asymmetric Mach-Zehnder interferometer to receive a signal light of a first wavelength; and a second photodetector connected to the first output port of the third asymmetric Mach-Zehnder interferometer and to the first output port of the sixth asymmetric Mach-Zehnder interferometer to receive a signal light of a second wavelength.

12. A wavelength demultiplexing control method comprising:

fabricating a photonic circuit that converts two orthogonal polarized waves contained in incident light into two same polarized waves, and has a first optical demultiplexing circuit and a second optical demultiplexing circuit provided for the two same polarized waves, the first optical demultiplexing circuit and the second optical demultiplexing circuit having a same configuration;

supplying a total output power of monitor lights extracted from same positions in the first optical demultiplexing circuit and the second optical demultiplexing circuit to a control circuit;

at the control circuit, controlling a first wavelength characteristic of the first optical demultiplexing circuit and a second wavelength characteristic of the second optical demultiplexing circuit, based on the total output power; and separating lights with a plurality of wavelengths contained in the incident light, based on the first wavelength characteristic and the second wavelength characteristic controlled by the control circuit.

* * * * *